US012555196B2

(12) United States Patent
Shekarforoush et al.

(10) Patent No.: US 12,555,196 B2
(45) Date of Patent: Feb. 17, 2026

(54) DUAL-CAMERA JOINT DENOISING-DEBLURRING USING BURST OF SHORT AND LONG EXPOSURE IMAGES

(71) Applicant: SAMSUNG ELECTRONICS CO., LTD., Suwon-si (KR)

(72) Inventors: Shayan Shekarforoush, Toronto (CA); Amanpreet Singh Walia, Brampton (CA); Aleksai Levinshtein, Thornhill (CA); Konstantinos G. Derpanis, Toronto (CA); Marcus A. Brubaker, Toronto (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 18/387,964

(22) Filed: Nov. 8, 2023

(65) Prior Publication Data
US 2024/0311968 A1 Sep. 19, 2024

Related U.S. Application Data

(60) Provisional application No. 63/452,939, filed on Mar. 17, 2023.

(51) Int. Cl.
G06T 5/50 (2006.01)
G06T 5/70 (2024.01)
G06T 5/73 (2024.01)
G06T 7/246 (2017.01)
H04N 23/71 (2023.01)
H04N 23/72 (2023.01)
(Continued)

(52) U.S. Cl.
CPC ............... *G06T 5/50* (2013.01); *G06T 5/70* (2024.01); *G06T 5/73* (2024.01); *G06T 7/248* (2017.01); *H04N 23/71* (2023.01); *H04N 23/72* (2023.01); *H04N 23/73* (2023.01); *H04N 23/76* (2023.01); *G06T 2207/10016* (2013.01); *G06T 2207/10024* (2013.01); *G06T 2207/10144* (2013.01); *G06T 2207/20081* (2013.01); *G06T 2207/20084* (2013.01); *G06T 2207/20201* (2013.01); *G06T 2207/20221* (2013.01); *G06T 2207/30241* (2013.01)

(58) Field of Classification Search
CPC ..................................... G06T 5/00; G06T 5/56
See application file for complete search history.

(56) References Cited

U.S. PATENT DOCUMENTS 8,184,926 B2 * 5/2012 Sun ........................... G06T 5/73
382/284
2021/0314474 A1 * 10/2021 Yang ..................... H04N 23/743
(Continued)

Primary Examiner — James M Hannett
(74) Attorney, Agent, or Firm — Sughrue Mion, PLLC

(57) ABSTRACT

The present disclosure provides methods, apparatuses, and computer-readable mediums for image processing, to be performed by an image processing framework, that include simultaneously capturing a long exposure image and a burst of short exposure images, recovering motion information from the burst of short exposure images, performing motion-aware deblurring of the long exposure image based on the motion information, denoising the burst of short exposure images based on the motion information, and fusing first features of a deblurred long exposure image and second features of a denoised image to obtain a final deblurred and denoised image.

20 Claims, 14 Drawing Sheets

(51) Int. Cl.
*H04N 23/73* (2023.01)
*H04N 23/76* (2023.01)

(56) References Cited

U.S. PATENT DOCUMENTS

2024/0119609 A1\* 4/2024 Goesele .................. G06N 3/02
2024/0169486 A1\* 5/2024 Liu ........................ G06T 5/70

\* cited by examiner

DUAL-CAMERA JOINT DENOISING-DEBLURRING USING BURST OF SHORT AND LONG EXPOSURE IMAGES

CROSS-REFERENCE TO RELATED APPLICATIONS

This application claims benefit of priority under 35 U.S.C. § 119 to U.S. Provisional Patent Application No. 63/452,939, filed on Mar. 17, 2023, in the U.S. Patent and Trademark Office, the disclosure of which is incorporated by reference herein in its entirety.

BACKGROUND

Field

The present disclosure relates generally to image processing, and more particularly to methods, apparatuses, and non-transitory computer-readable mediums for jointly denoising and deblurring images.

Description of Related Art

Rapid improvements in both camera hardware and image processing software have turned modern mobile devices (e.g., smartphones, cellular phones, tablets, digital cameras, personal digital assistants (PDA), wearable devices) into powerful yet portable image and/or video recording devices. These improvements may have enabled and/or encouraged users of these mobile devices to shoot photos without any special preparation, setup, and/or framing of the shot. However, capturing high quality images may remain a daunting task, especially under challenging conditions such as, but not limited to, low-light, and dynamic (e.g., motion) scenes. That is, even with the recent improvements to mobile devices in this regard, the related mobile devices may still be constrained by physical sensor sizes and/or image post processing software.

For example, an exposure time of an image may become a significant factor that may affect the quality of the final image. That is, increasing the exposure time of an image may allow for more light to reach (and be captured by) the sensor, which may yield a resulting image with a lower noise level and/or a higher exposure and/or image intensity (e.g., brightness). However, a long exposure time may cause objects to appear unpleasantly blurry due to movement of one or more elements of the scene being captured and/or movement of the sensor while the image is being captured. The need for a longer exposure time may be abated by increasing sensitivity settings (e.g., International Standards Organization (ISO) sensitivity). However, an increased sensitivity may result in an image that may be more susceptible to noise and/or color distortion.

Related image enhancement techniques may attempt to address the exposure time limitations under low-light scenes by using a pair of long exposure and short exposure images. These two image modalities may offer complementary strengths and weakness. For example, relatively long exposures may yield images that may be clean but may be blurry due to camera and/or object motion, whereas relatively short exposure times may yield sharp but possibly noisy images due to the low photon count. Alternatively or additionally, methods such as, but not limited to, denoising and deblurring, may attempt to restore and/or improve the quality of noisy or blurry images.

Thus, there exists a need for further improvements in image processing technology, as the need for capturing clean and sharp images in low-light and/or dynamic scenes may be constrained by sensor size and/or exposure times. Improvements are presented herein. These improvements may also be applicable to other image denoising and/or deblurring technologies and/or other image processing technologies.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for performing image processing are disclosed by the present disclosure. Aspects of the present disclosure provide for jointly denoising and deblurring using a burst of short exposure images and long exposure images.

According to an aspect of the present disclosure, a method of image processing, to be performed by a processor of an image processing framework, is provided. The method includes simultaneously capturing a long exposure image and a burst of short exposure images, recovering motion information from the burst of short exposure images, performing motion-aware deblurring of the long exposure image, based on the motion information, denoising the burst of short exposure images, based on the motion information, and fusing first features of a deblurred long exposure image and second features of a denoised image to obtain a final deblurred and denoised image.

In some embodiments, the simultaneous capturing of the long exposure image and the burst of short exposure images may include analyzing a scene, determining, based on the analyzing, whether the scene meets low-light criteria, and based on determining that the scene meets the low-light criteria, controlling a first camera to capture the long exposure image during a first time period, and controlling a second camera to capture the burst of short exposure images during a second time period. The first time period and the second time period may overlap each other.

In some embodiments, the recovering of the motion information may include generating, using an optical flow network, a plurality of optical flows, based on the burst of short exposure images, and generating the motion information including the plurality of optical flows.

In some embodiments, the generating of the plurality of optical flows may include obtaining discrete samples of motion trajectories of a plurality of points in each image of the burst of short exposure images relative to a reference position at a reference time step, and interpolating, for each corresponding point of the plurality of points, the discrete samples of the corresponding point along a motion trajectory of the corresponding point.

In some embodiments, the performing of the motion-aware deblurring of the long exposure image may include providing, to a motion-aware deblurring network, the long exposure image and the motion information including the plurality of optical flows, and obtaining, from the motion-aware deblurring network, the first features of the deblurred long exposure image, based on the plurality of optical flows.

In some embodiments, the denoising of the burst of short exposure images may include providing, to a burst denoising network, the burst of short exposure images and the motion information including the plurality of optical flows, and obtaining, from the burst denoising network, the second features of the denoised image, based on the plurality of optical flows.

In some embodiments, the denoising of the burst of short exposure images may include obtaining respective feature representations of the burst of short exposure images by encoding each image of burst of short exposure images, warping the feature representations to obtain aligned feature representations, and fusing the aligned feature representations to generate the second features of the denoised image.

In some embodiments, the fusing of the first features of the deblurred long exposure image and the second features of the denoised image may include concatenating the first features of the deblurred long exposure image and the second features of the denoised image into a feature map, providing the feature map to a joint denoising-deblurring network, and decoding a result of the joint denoising-deblurring network into the final deblurred and denoised image.

In some embodiments, the method may further include creating a dataset of synthetic dual camera images, and training the image processing framework using the dataset of synthetic dual camera images.

In some embodiments, the creating of the dataset of the synthetic dual camera images may include obtaining a plurality of consecutive clean images from a sequence of images, inverting tone-mapping, gamma compression, and color correction on the plurality of consecutive clean images, generating a synthetic long exposure image by averaging and inserting noise to the inverted plurality of consecutive clean images, and generating a synthetic burst of short exposure images by subsampling the inverted plurality of consecutive clean images, and adding noise and color distortion to the subsampled plurality of consecutive clean images.

According to an aspect of the present disclosure, an apparatus for image processing, to be performed by an image processing framework, is provided. The apparatus includes at least one camera, a memory storing instructions, and a processor communicatively coupled to the at least one camera and to the memory. The processor is configured to execute the instructions to simultaneously capture, using the at least one camera, a long exposure image and a burst of short exposure images, recover motion information from the burst of short exposure images, perform motion-aware deblurring of the long exposure image, based on the motion information, denoise the burst of short exposure images, based on the motion information, and fuse first features of a deblurred long exposure image and second features of a denoised image to obtain a final deblurred and denoised image.

In some embodiments, the processor may be further configured to execute further instructions to analyze a scene, determine, based on the analysis of the scene, whether the scene meets low-light criteria, and based on a determination that the scene meets the low-light criteria, control a first camera of the at least one camera to capture the long exposure image during a first time period, and control a second camera of the at least one camera to capture the burst of short exposure images during a second time period. The first time period and the second time period may overlap each other.

In some embodiments, the processor may be further configured to execute further instructions to generate, using an optical flow network, a plurality of optical flows, based on the burst of short exposure images, and generate the motion information including the plurality of optical flows.

In some embodiments, the processor may be further configured to execute further instructions to obtain discrete samples of motion trajectories of a plurality of points in each image of the burst of short exposure images relative to a reference position at a reference time step, and interpolate, for each corresponding point of the plurality of points, the discrete samples of the corresponding point along a motion trajectory of the corresponding point.

In some embodiments, the processor may be further configured to execute further instructions to provide, to a motion-aware deblurring network, the long exposure image and the motion information including the plurality of optical flows, obtain, from the motion-aware deblurring network, the first features of the deblurred long exposure image, based on the plurality of optical flows, provide, to a burst denoising network, the burst of short exposure images and the motion information including the plurality of optical flows, and obtain, from the burst denoising network, the second features of the denoised image, based on the plurality of optical flows.

In some embodiments, the processor may be further configured to execute further instructions to obtain respective feature representations of the burst of short exposure images by encoding each image of burst of short exposure images, warp the feature representations to obtain aligned feature representations, and fuse the aligned feature representations to generate the second features of the denoised image.

In some embodiments, the processor may be further configured to execute further instructions to concatenate the first features of the deblurred long exposure image and the second features of the denoised image into a feature map, provide the feature map to a joint denoising-deblurring network, and decode a result of the joint denoising-deblurring network into the final deblurred and denoised image.

In some embodiments, the processor may be further configured to execute further instructions to create a dataset of synthetic dual camera images, obtain a plurality of consecutive clean images from a sequence of images, invert tone-mapping, gamma compression, and color correction on the plurality of consecutive clean images, generate a synthetic long exposure image by averaging and inserting noise to the inverted plurality of consecutive clean images, generate a synthetic burst of short exposure images by subsampling the inverted plurality of consecutive clean images, and adding noise and color distortion to the subsampled plurality of consecutive clean images, and train the image processing framework using the dataset of synthetic dual camera images.

According to an aspect of the present disclosure, a non-transitory computer-readable storage medium storing computer-executable instructions for image processing is provided. The computer-executable instructions, when executed by at least one processor of a device, cause the device to simultaneously capture a long exposure image and a burst of short exposure images, recover motion information from the burst of short exposure images, perform motion-aware deblurring of the long exposure image, based on the motion information, denoise the burst of short exposure images, based on the motion information, and fuse first features of a deblurred long exposure image and second features of a denoised image to obtain a final deblurred and denoised image.

In some embodiments, the computer-executable instructions, when executed by the at least one processor, may further cause the device to analyze a scene, determine, based on the analysis of the scene, whether the scene meets low-light criteria, and based on a determination that the scene meets the low-light criteria, control a first camera to capture the long exposure image during a first time period, and control a second camera to capture the burst of short exposure images during a second time period. The first time period and the second time period may overlap each other.

Additional aspects are set forth in part in the description that follows and, in part, may be apparent from the description, or may be learned by practice of the presented embodiments of the disclosure.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
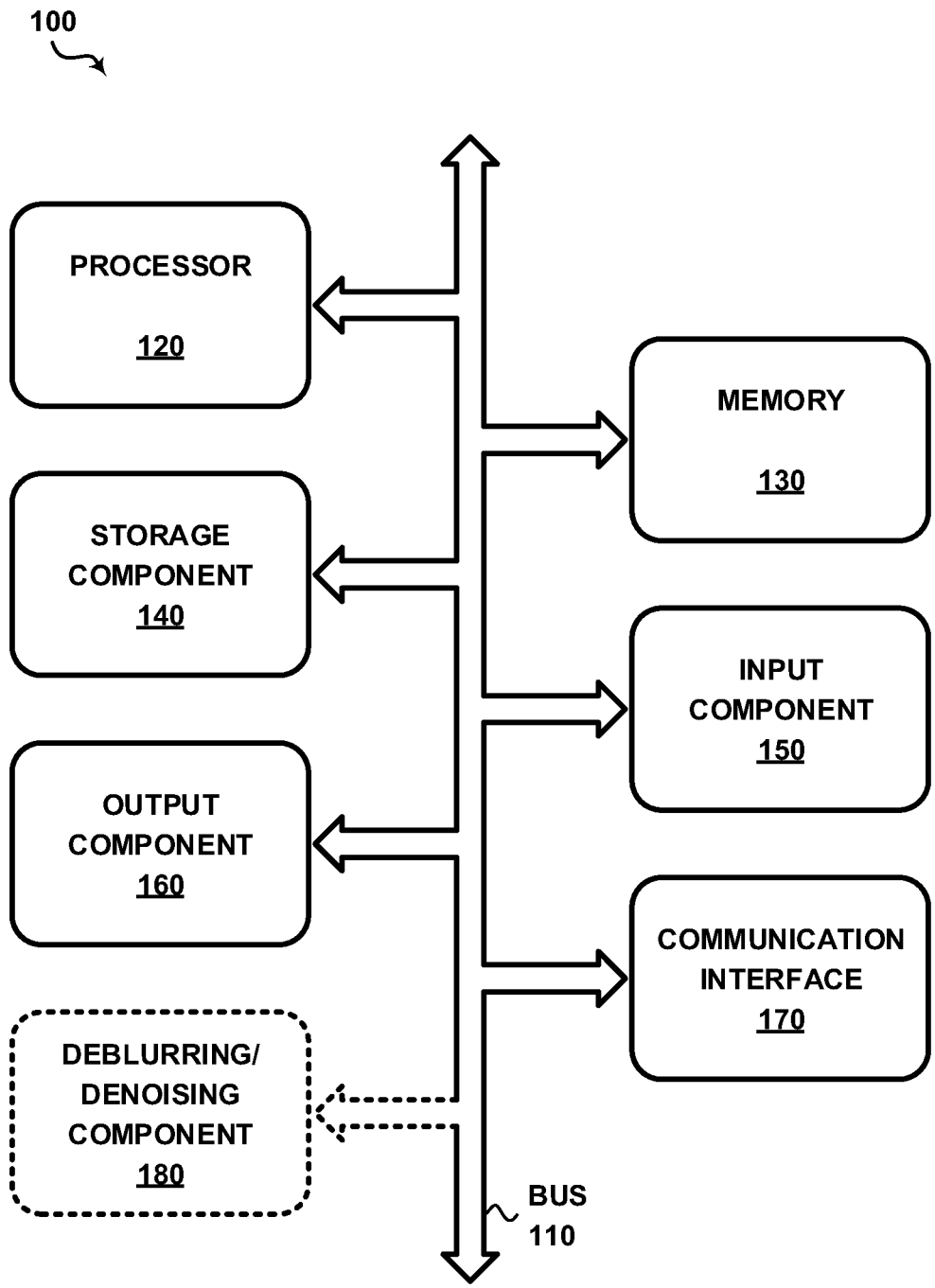
FIG. 1 depicts an example of a device that may be used in implementing one or more aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it is to be apparent to those skilled in the art that these concepts may be practiced without these specific details. In some instances, well known structures and components are shown in block diagram form in order to avoid obscuring such concepts. In the descriptions that follow, like parts are marked throughout the specification and drawings with the same numerals, respectively.

The following description provides examples, and is not limiting of the scope, applicability, or embodiments set forth in the claims. Changes may be made in the function and/or arrangement of elements discussed without departing from the scope of the present disclosure. Various examples may omit, substitute, or add various procedures or components as appropriate. For example, the methods described may be performed in an order different from that described, and various steps may be added, omitted, and/or combined. Alternatively or additionally, features described with reference to some examples may be combined in other examples.

Various aspects and/or features may be presented in terms of systems that may include a number of devices, components, modules, and the like. It is to be understood and appreciated that the various systems may include additional devices, components, modules, and the like and/or may not include all of the devices, components, modules, and the like discussed in connection with the figures. A combination of these approaches may also be used.

As a general introduction to the subject matter described in more detail below, aspects described herein are directed towards apparatuses, methods, and non-transitory computer-readable mediums for performing image processing. Aspects described herein may be used to jointly denoise and deblur bursts of short exposure images and long exposure images.

Taking photographs and/or videos using mobile devices (e.g., smartphones, cellular phones, tablets, digital cameras, personal digital assistants (PDA), and wearable devices) under low-light and/or dynamic (e.g., motion) conditions may result in images that may be blurry and/or noisy. For example, in low-light conditions, a camera sensor may not receive sufficient light to produce a bright, clear, and/or sharp image, based on the exposure time of the image and/or the physical size of the camera sensor. This limitation may be more prevalent when using a built-in camera of a mobile device that may have a smaller sensor when compared to dedicated or professional camera equipment. For example, the camera sensor of the mobile device may be limited by form factor constraints that may not be applicable to the professional camera equipment.

In such an example, the exposure time of the time may be increased in order for the camera sensor to receive a sufficient amount of light for producing a clean and sharp image. However, increasing the exposure time may also introduce blur to the image due to motion of the camera (e.g., mobile device) and/or one or more subjects of the image being captured. Alternatively or additionally, a digital gain may be increased in order to increase the brightness of the captured image, which may result in the addition of noise and/or color artifacts to the resulting images.

Related image enhancement techniques may attempt to address the exposure time limitations under low-light scenes by using a pair of long exposure and short exposure images. These two image modalities may offer complementary strengths and weakness. For example, relatively long exposures may yield images that may be clean but may be blurry due to camera and/or object motion, whereas relatively short exposure times may yield sharp but possibly noisy images due to a low photon count. Given noisy or blurry images, methods such as, but not limited to, denoising and deblurring, may attempt to restore and/or improve the quality of the captured images.

As used herein, denoising may refer to an image processing technique that may be used to decrease noise (e.g., grainy spots, discolorations, and the like) in images while minimizing the loss of quality in the images, and deblurring may refer to an image processing technique that may be used to remove blurring artifacts from images and attempt to recover a sharp image. However, these image restoration processes may be typically addressed independently and may not make use of complementary information that may be available by concurrently obtaining the two types of images (e.g., long exposure and short exposure). As a result, these independent approaches may prove inefficient and/or may be unable to properly remove the noise and/or blurring artifacts in the images.

In aspects described herein, the present disclosure provides apparatuses, methods, and non-transitory computer-readable mediums for performing joint denoising and deblurring by a device. That is, the present disclosure provides an image processing framework for jointly denoising and deblurring images that may synchronize capture of a burst of short exposure images and a long exposure image, estimate a motion trajectory in the burst of short exposure images, use the estimated motion trajectory to denoise and deblur the images, and fuse the short and long exposure images to provide a clean and sharp output image.

In some aspects, the image processing framework may include a convolutional neural network (CNN) architecture for jointly denoising and deblurring images that may consist of a small number of trainable independent components. Such components may include an optical flow network, a motion-aware deblurring network, a burst denoising network, and a joint decoder. The optical flow network may estimate motion offsets based on the burst of short exposure images to generate a plurality of optical flows. The motion-aware deblurring network may deblur the long exposure image based on the plurality of optical flows. The burst denoising network may denoise the burst of short exposure images based on the plurality of optical flows. The joint decoder may fuse the denoising features and the deblurring features to produce a clean and sharp image.

The aspects described herein provide several advantages over related image processing approaches to denoising and deblurring images by synchronizing the capture of a burst of short exposure images from one camera and the capture of a long exposure image from another camera. Consequently, the two sets of images may be jointly processed (e.g., fused together) to take advantage of the complementary information included by the images from both sources in order to obtain a clean and sharp image. Aspects described herein may further provide for guiding a motion-aware deblurring network with external motion information from the synchronized short exposure burst, and as such, obtaining an improved deblurring result when compared to a deblurring result without such external motion information. Furthermore, as mobile devices with multiple rear-facing cameras become more commonplace, the aspects described herein may be provided using these already-existing cameras.

As noted above, certain embodiments are discussed herein that relate to image processing and jointly denoising and deblurring images. Before discussing these concepts in further detail, however, an example of a computing device that may be used in implementing and/or otherwise providing various aspects of the present disclosure is discussed with respect to FIG. 1.

FIG. 1 depicts an example of a device 100 that may be used in implementing one or more aspects of the present disclosure in accordance with one or more illustrative aspects discussed herein. For example, device 100 may, in some instances, implement one or more aspects of the present disclosure by reading and/or executing instructions and performing one or more actions accordingly. In one or more arrangements, device 100 may represent, be incorporated into, and/or include a robotic device, a robot controller, a desktop computer, a computer server, a virtual machine, a network appliance, a mobile device (e.g., a laptop computer, a tablet computer, a personal digital assistant (PDA), a smart phone, any other type of mobile computing device, and the like), a wearable device (e.g., smart watch, headset, headphones, and the like), a smart device (e.g., a voice-controlled virtual assistant, a set-top box (STB), a refrigerator, an air conditioner, a microwave, a television, and the like), an Internet-of-Things (IoT) device, and/or any other type of data processing device.

For example, the device 100 may include a processor, a personal computer (PC), a printed circuit board (PCB) including a computing device, a mini-computer, a mainframe computer, a microcomputer, a telephonic computing device, a wired/wireless computing device (e.g., a smartphone, a PDA), a laptop, a tablet, a smart device, a wearable device, or any other similar functioning device.

In some embodiments, as shown in FIG. 1, the device 100 may include a set of components, such as a processor 120, a memory 130, a storage component 140, an input component 150, an output component 160, a communication interface 170, and a deblurring/denoising component 180. The set of components of the device 100 may be communicatively coupled via a bus 110.

The bus 110 may include one or more components that may permit communication among the set of components of the device 100. For example, the bus 110 may be a communication bus, a cross-over bar, a network, or the like. Although the bus 110 is depicted as a single line in FIG. 1, the bus 110 may be implemented using multiple (e.g., two or more) connections between the set of components of device 100. The present disclosure is not limited in this regard.

The device 100 may include one or more processors, such as the processor 120. The processor 120 may be implemented in hardware, firmware, and/or a combination of hardware and software. For example, the processor 120 may include a central processing unit (CPU), an application processor (AP), a graphics processing unit (GPU), an accelerated processing unit (APU), a microprocessor, a microcontroller, a digital signal processor (DSP), a field-programmable gate array (FPGA), an application-specific integrated circuit (ASIC), an image signal processor (ISP), a neural processing unit (NPU), a sensor hub processor, a communication processor (CP), an artificial intelligence (AI)-dedicated processor designed to have a hardware structure specified to process an AI model, a general purpose single-chip and/or multi-chip processor, or other programmable logic device, discrete gate or transistor logic, discrete hardware components, or any combination thereof designed to perform the functions described herein. A general purpose processor may include a microprocessor, or any conventional processor, controller, microcontroller, or state machine.

The processor 120 may also be implemented as a combination of computing devices, such as a combination of a DSP and a microprocessor, a combination of a main processor and an auxiliary processor, a plurality of microprocessors, one or more microprocessors in conjunction with a DSP core, or any other such configuration. In some embodiments, particular processes and methods may be performed by circuitry that is specific to a given function. In optional or additional embodiments, an auxiliary processor may be configured to consume less power than the main processor. Alternatively or additionally, the one or more processors may be implemented separately (e.g., as several distinct chips) and/or may be combined into a single form.

The processor 120 may control overall operation of the device 100 and/or of the set of components of device 100 (e.g., the memory 130, the storage component 140, the input component 150, the output component 160, the communication interface 170, and the deblurring/denoising component 180).

The device 100 may further include the memory 130. In some embodiments, the memory 130 may include volatile memory such as, but not limited to, random access memory (RAM), static RAM (SRAM), dynamic RAM (DRAM), and the like. In optional or additional embodiments, the memory 130 may include non-volatile memory such as, but not limited to, read only memory (ROM), electrically erasable programmable ROM (EPROM), NAND flash memory, phase-change RAM (PRAM), magnetic RAM (MRAM), resistive RAM (RRAM), ferroelectric RAM (FRAM), magnetic memory, optical memory, and the like. However, the present disclosure is not limited in this regard, and the memory 130 may include other types of dynamic and/or static memory storage. In some embodiments, the memory 130 may store information and/or instructions for use (e.g., execution) by the processor 120.

The storage component 140 of device 100 may store information and/or computer-readable instructions and/or code related to the operation and use of the device 100. For example, the storage component 140 may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

The device 100 may further include the input component 150. The input component 150 may include one or more components that may permit the device 100 to receive information, such as via user input (e.g., a touch screen, a keyboard, a keypad, a mouse, a stylus, a button, a switch, a microphone, a camera, a virtual reality (VR) headset, haptic gloves, and the like). Alternatively or additionally, the input component 150 may include one or more sensors for sensing information (e.g., a global positioning system (GPS) component, an accelerometer, a gyroscope, an actuator, a transducer, a contact sensor, a proximity sensor, a ranging device, a light meter, an exposure meter, a camera, a video camera, a depth camera, a time-of-flight (TOF) camera, a stereoscopic camera, and the like). In some embodiments, the input component 150 may include more than one of a same sensor type (e.g., multiple cameras).

The output component 160 of device 100 may include one or more components that may provide output information from the device 100 (e.g., a display, a liquid crystal display (LCD), light-emitting diodes (LEDs), organic light emitting diodes (OLEDs), a haptic feedback device, a speaker, a buzzer, an alarm, and the like).

The device 100 may further include the communication interface 170. The communication interface 170 may include a receiver component, a transmitter component, and/or a transceiver component. The communication interface 170 may enable the device 100 to establish connections and/or transfer communications with other devices (e.g., a server, another device). The communications may be effected via a wired connection, a wireless connection, or a combination of wired and wireless connections. The communication interface 170 may permit the device 100 to receive information from another device and/or provide information to another device. In some embodiments, the communication interface 170 may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface 170 may provide for communications with another device via a device-to-device (D2D) communication link, such as, FlashLinQ, WiMedia, Bluetooth™, Bluetooth™ Low Energy (BLE), ZigBee, Institute of Electrical and Electronics Engineers (IEEE) 802.11x (Wi-Fi), LTE, 5G, and the like. In optional or additional embodiments, the communication interface 170 may include an Ethernet interface, an optical interface, a coaxial interface, an infrared interface, a radio frequency (RF) interface, a USB interface, an IEEE 1094 (FireWire) interface, or the like.

In some embodiments, the device 100 may include the deblurring/denoising component 180, which may be configured to perform image processing. For example, the deblurring/denoising component 180 may be configured to simultaneously capture a long exposure image and a burst of short exposure images, recover motion information from the burst of short exposure images, perform motion-aware deblurring of the long exposure image, denoise the burst of short exposure images, and fuse deblurring features and denoising features to obtain a clean and sharp image.

The device 100 may perform one or more processes described herein. The device 100 may perform operations based on the processor 120 executing computer-readable instructions and/or code that may be stored by a non-transitory computer-readable medium, such as the memory 130 and/or the storage component 140. A computer-readable medium may refer to a non-transitory memory device. A non-transitory memory device may include memory space within a single physical storage device and/or memory space spread across multiple physical storage devices.

Computer-readable instructions and/or code may be read into the memory 130 and/or the storage component 140 from another computer-readable medium or from another device via the communication interface 170. The computer-readable instructions and/or code stored in the memory 130 and/or storage component 140, if or when executed by the processor 120, may cause the device 100 to perform one or more processes described herein.

Alternatively or additionally, hardwired circuitry may be used in place of or in combination with software instructions to perform one or more processes described herein. Thus, embodiments described herein are not limited to any specific combination of hardware circuitry and software.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may perform one or more functions described as being performed by another set of components shown in FIG. 1.

Having discussed an example of a device that may be used in providing and/or implementing various aspects of the present disclosure, a number of embodiments are now discussed in further detail. In particular, and as introduced above, some aspects of the present disclosure generally relate to performing image processing.

Figure 2:
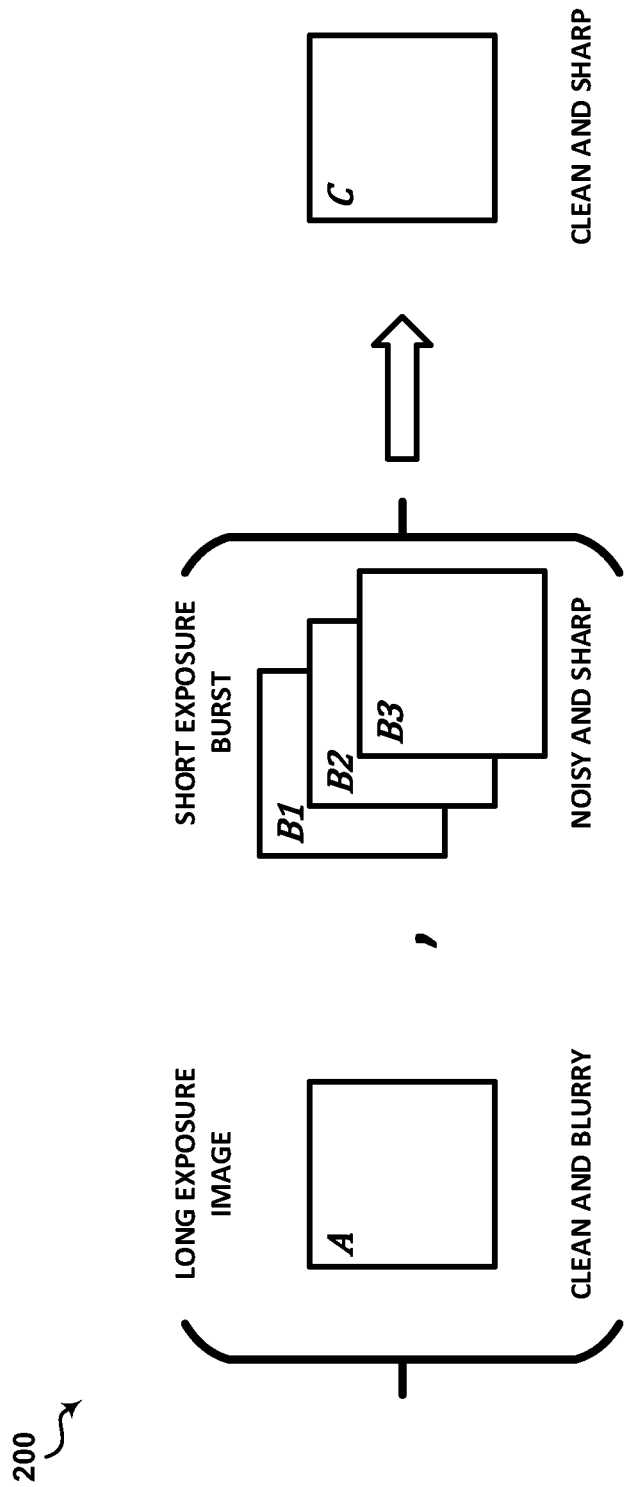
FIG. 2 illustrates an example of performing joint denoising and deblurring, in accordance with various aspects of the present disclosure.

FIG. 2 illustrates an example of performing joint denoising and deblurring, in accordance with various aspects of the present disclosure. Referring to FIG. 2, aspects of the present disclosure provide for an image processing framework that jointly process a long exposure image A and a burst of short exposure images (e.g., first short exposure image B1, second short exposure image B2, and third short exposure image B3, hereinafter generally referred to as "B") to produce a higher quality output image C.

Typically, capturing relatively high quality images in low-light situations may prove difficult as there may not be sufficient light to capture the scene with a desired brightness level. In addition, built-in cameras on mobile devices may have relatively small sensors due to form factor constraints, and thus, may perform comparatively worse in low-light conditions when compared to dedicated and/or professional photographic equipment.

Low-light performance may be improved by increasing the exposure time of an image in order to allow for more light to reach (and be captured by) the sensor. However, a longer exposure time may also result in a blurry image due to motion of the camera sensor and/or motion of the objects in the scene, for example, as shown in the long exposure image A of FIG. 2. Alternatively or additionally, capturing images with a relatively shorter exposure time, and/or increasing sensitivity settings (e.g., International Standards Organization (ISO) sensitivity, digital gain) to compensate for the shorter exposure time, may result in images that are more susceptible to noise and/or color distortion, for example, as shown in the short exposure burst B of FIG. 2.

Aspects described herein provide for synchronously (e.g., concurrently) capturing the long exposure image A and the short exposure burst B which may allow for combining complementary information from these images to obtain a sharp and clear resulting image C. In some embodiments, an image capturing apparatus may be used to simultaneously capture the long exposure image A, which may be clean and blurry, with a first camera or image sensor, and capture the short exposure burst B, which may be noisy and sharp, with a second camera or image sensor. For example, the image capturing apparatus may be and/or may include two or more cameras and/or image sensors that may be mounted on a mobile device. The cameras and/or image sensors may be mounted to face in a similar direction. However, the present disclosure is not limited in this regard, and the image capturing apparatus may consist of other image capturing systems capable of capturing a long exposure image concurrently with a short exposure burst of images.

In some embodiments, it may be assumed that the first and second cameras may be mounted to be relatively rigidly with respect to each other. That is, relative positions of the first and second cameras with respect to each other may be substantially similar and/or the same. Consequently, temporal synchronization of the long exposure image A and the short exposure burst B may enable non-blind deblurring of the long exposure image A based on motion information extracted from the short exposure burst B. In addition, denoising features from the short exposure burst B and deblurring features from the long exposure image A may be fused to obtain the clean and sharp image C.

Figure 3:
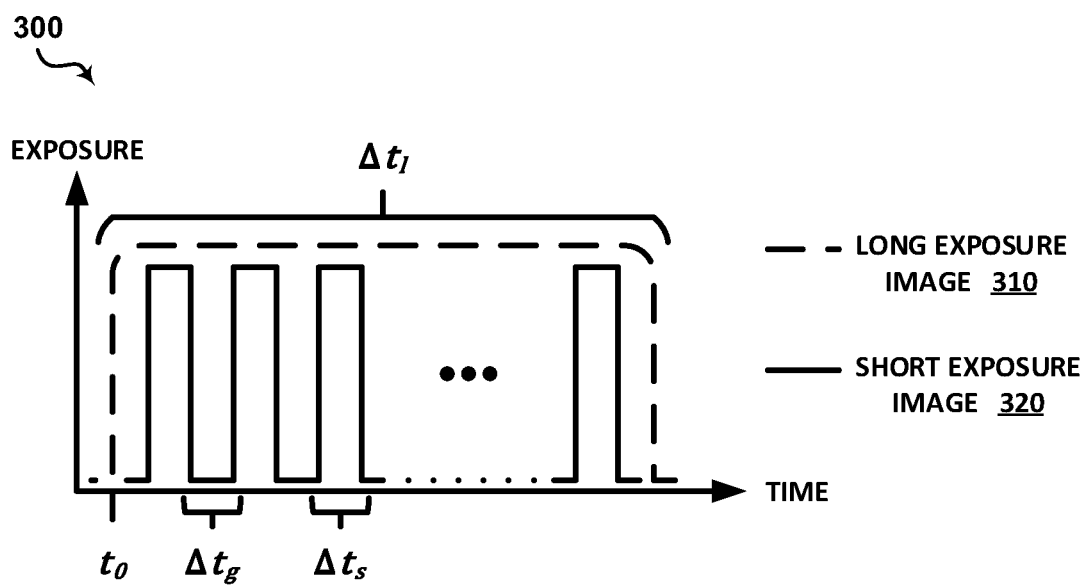
FIG. 3 depicts an example of temporal synchronization of image captures, in accordance with various aspects of the present disclosure.

FIG. 3 depicts an example of temporal synchronization of image captures, in accordance with various aspects of the present disclosure. Referring to FIG. 3, graph 300 depicts a long exposure image 310 and a short exposure image burst 320 that are captured synchronously.

In some embodiments, the long exposure image 310 and the short exposure image burst 320 may consist of H×W resolution standard red-green-blue (sRGB) (e.g., color) images, where H and W are positive integers greater than zero (0). In optional or additional embodiments, the long exposure image 310 and the short exposure image burst 320 may be black-and-white images. The present disclosure is not limited in this regard. For example, in some embodiments, the long exposure image 310 and the short exposure image burst 320 may be and/or may include RAW images.

As shown in FIG. 3, the long exposure image 310 and the short exposure image burst 320 may be captured during a substantially similar and/or the same time span. For example, the long exposure image 310, L, may be captured during a $\Delta t_l$ time period (interval) starting from to. The short exposure image burst 320, $\{S_i\}_{i=1}^{N}$, may be obtained by sequentially capturing a plurality of N images during a substantially similar and/or the same $\Delta t_l$ time period starting from $t_0$, where N is a positive integer greater than one (1). For example, N may be equal to five (5) (e.g., the short exposure image burst 320 consists of five (5) images), as such a data modality may be available in related mobile devices (e.g., smartphones). Alternatively or additionally, the short exposure image burst 320 may be obtained by extracting a plurality of N images from a video (e.g., a sequence of video images) that may have been captured during a substantially similar and/or the same $\Delta t_l$ time period starting from to. The present disclosure is not limited in this regard.

Each image (or frame) of the short exposure image burst 320 may be captured during a corresponding $\Delta t_s$ time period. In some embodiments, there may be read-out gaps $\Delta t_g$ between the $\Delta t_s$ time periods. That is, due to physical limitations of the camera or image sensor, there may be read-out gaps $\Delta t_g$ between frames of the short exposure image burst 320 that may cause missing information between the frames. Alternatively or additionally, the long exposure image 310 may continuously capture information (without gaps) during the $\Delta t_l$ time period.

In some embodiments, the long exposure image 310 may be captured by a first camera or image sensor and the short exposure image burst 320 may be captured by a second camera or image sensor. Alternatively or additionally, the long exposure image 310 may be captured by the second camera or image sensor and the short exposure image burst 320 may be captured by the first camera or image sensor. In some embodiments, the first and second cameras or image sensors may be included in an image capturing apparatus that may be mounted on a mobile device (e.g., smartphone). The cameras and/or image sensors may be mounted to face in a similar direction. However, the present disclosure is not limited in this regard, and the image capturing apparatus may consist of other image capturing systems capable of capturing a long exposure image concurrently with a short exposure burst of images.

The raw measurements of the long exposure image 310 and the short exposure image burst 320 may be respectively denoted by R and $R_i$, and may be represented by equations similar to Equations 1 and 2, as shown below.

$$R = \int_{t=t_0}^{t_0+\Delta t_l} I(r)dt \qquad [\text{Eq. 1}]$$

$$R_i = \int_{t=\tau_i}^{\tau_i+\Delta t_s} I(r)dt \qquad [\text{Eq. 2}]$$

Referring to Equations 1 and 2, I(t) may represent the incoming light to the camera or image sensor at time t. The capture of the i-th image in the short exposure image burst 320 may start at $t_i$ and may end after $\Delta t_s$. The capture of the long exposure image 310 may span an interval that may start from to and may end after $\Delta t_l$.

The raw measurements R and $R_i$ of the long exposure image 310 and the short exposure image burst 320, respectively, may be noisy due to several factors that may include, but not be limited to, sensor and/or photon noise. Consequently, the first and second cameras may process the raw measurements R and $R_i$ with an image signal processing pipeline (ISP) to produce visually appealing images, L and $\{S_i\}_{i=1}^N$, respectively.

As described in further detail below with reference to FIGS. 5 to 12, the image processing framework may provide for restoring a clean and sharp image from pairs of long exposure images 310 and short exposure image bursts 320 (e.g., L and $\{S_i\}_{i=1}^N$). In some embodiments, the clean and sharp image may be aligned with a reference image in the short exposure image burst 320. For example, the reference image may have an index m within the plurality of N images in the short exposure image burst 320, where m is a positive integer less than or equal to N. In some embodiments, index m may point to a middle image in the plurality of N images in the short exposure image burst 320. For example, when the plurality of N images consists of an odd number of images (e.g., N=2k−1), index m may be equal to k (e.g., m=k).

Figure 4:
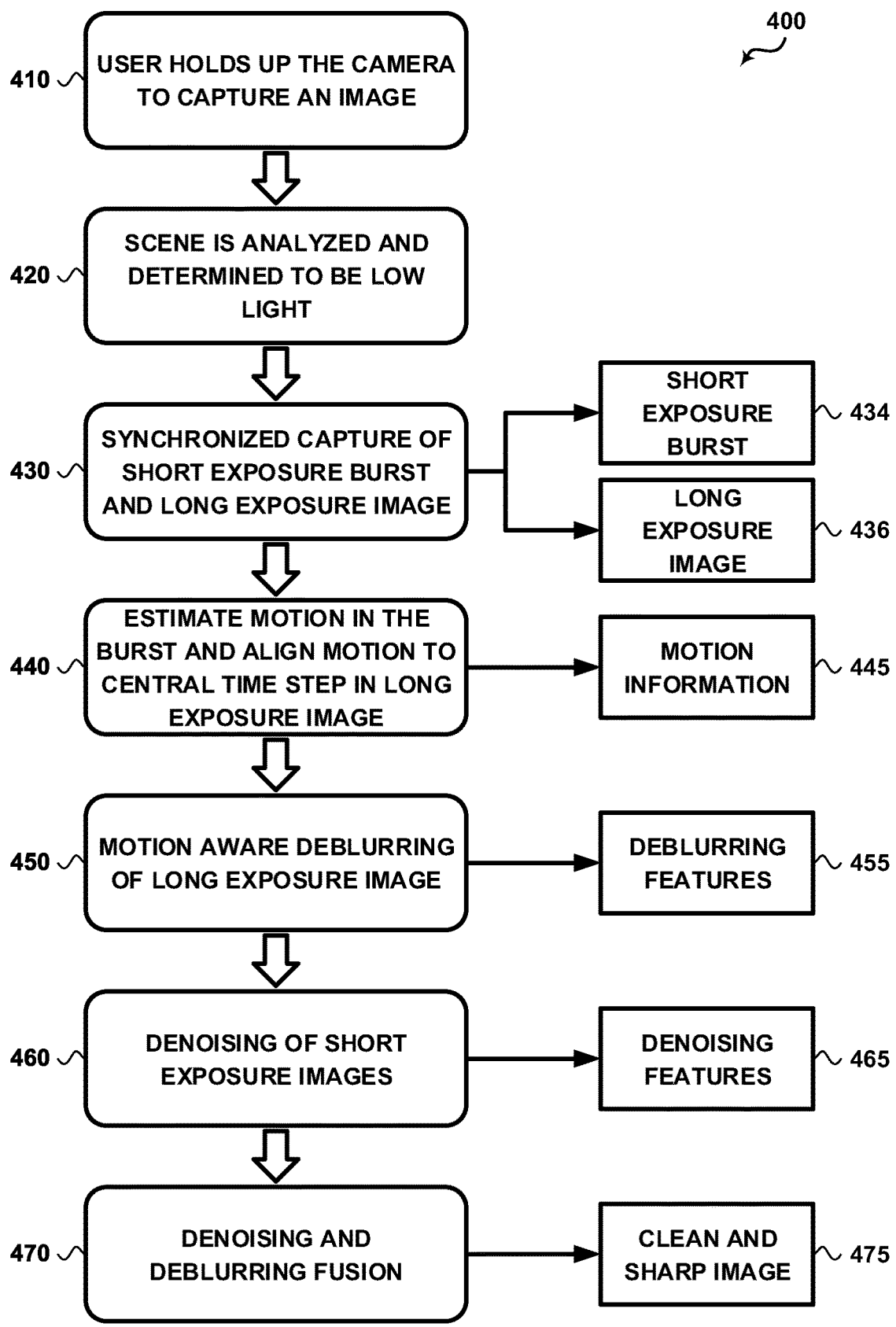
FIG. 4 illustrates a flowchart for performing joint denoising and deblurring by an image processing framework, in accordance with various aspects of the present disclosure.

FIG. 4 illustrates a flowchart for performing joint denoising and deblurring by an image processing framework, in accordance with various aspects of the present disclosure.

Referring to FIG. 4, a flowchart of an example method 400 for performing joint denoising and deblurring by an image processing framework that implements one or more aspects of the present disclosure is illustrated. In some embodiments, at least a portion of the method 400 may be performed by the device 100 of FIG. 1, which may include the deblurring/denoising component 180. Alternatively or additionally, another computing device (e.g., a server, a laptop, a smartphone, a UE, a wearable device, and the like) that includes the deblurring/denoising component 180 may perform at least a portion of the method 400. For example, in some embodiments, the device 100 and the other computing device may perform the method 400 in conjunction. That is, the device 100 may perform a portion of the method 400 and a remaining portion of the method 400 may be performed by one or more other computing devices.

At block 410 of FIG. 4, the method 400 may include a user of a device (e.g., device 100, mobile device, smartphone, and the like) may hold up a camera or image sensor of the device 100 in order to capture an image with the camera or image sensor. That is, the user of the device 100 may perform an action that may indicate that the user is preparing to capture an image with the device 100. In some embodiments, the user may indicate to the device 100 that an image is to be captured by performing other optional or additional actions, such as, but not limited to, activating (e.g., pressing, touching) a predetermined user interface element and/or button, starting an image capturing application, and the like. The present disclosure is not limited in this regard.

At block 420, the method 400 may include analyzing a current scene and/or surrounding environment to determine one or more conditions related to the capturing of an image. For example, the device 100, using a light meter and/or exposure meter of the input component 150, may measure and/or obtain an amount of light in the current scene and/or surrounding environment. The method 400 may include determining whether the amount of light is sufficient for capturing the image. For example, when the amount of light meets a predetermined low-light threshold, the method 400 may determine that the current scene and/or surrounding environment is a low-light scene, and proceed to block 430.

Alternatively or additionally, when the amount of light fails to meet the predetermined low-light threshold, operation of the method 400 may be stopped. For example, when the amount of light is not sufficient to capture an image, the user may be notified that light conditions are not sufficient for capturing an image. In some embodiments, the user may be prompted to activate a flash or other light source prior to proceeding with the image capture of block 430.

As another example, when the amount of light exceeds the predetermined low-light threshold (e.g., a bright scene and/or surrounding environment), the method 400 may determine whether to stop operation or to proceed to block 430 based on other conditions related to the capturing of the image, such as, but not limited to, detected movement of the device 100 and/or one or more subjects of the scene, battery level of the device 100, and the like. That is, the method 400 may determine to proceed to block 430 when the detected movement of the device 100 and/or one or more subjects of the scene may affect the quality of the resulting image. Alternatively or additionally, the method 400 may determine to stop operation when the battery level of the device 100 is below a battery level threshold in order to conserve battery power, for example.

At block 430, the method 400 may synchronize capture of a short exposure image burst 434 and a long exposure image 436, as described above with reference to FIG. 3. That is, the short exposure image burst 434, $\{S_i\}_{i=1}^N$, may consist of a plurality of N images that have been captured at a substantially similar and/or the same time interval as the long exposure image 436, L. In some embodiments, the short exposure image burst 434 and the long exposure image 436 may consist of sRGB images having a resolution of H×W pixels.

At block 440, the method 400 may estimate motion information 445 from the short exposure image burst 434. The motion information 445 may indicate a detected movement of the device 100 and/or a motion of one or more subjects of the scene captured by the short exposure image burst 434. Additionally, the method 400 may align the motion indicated by the motion information 445 to a central time step in the long exposure image 436. For example, the method 400 may determine a reference image from the short exposure image burst 434 and align the long exposure image 436 to the reference image. That is, the motion information 445 may include offsets (e.g., motion vectors, optical flow vectors) between scene locations in the reference image and corresponding scene locations in the remaining (non-reference) images in the short exposure image burst 434. In some embodiments, the motion information 445 may include H×W×(N−1)×2 tensors.

At block 450, the method 400 may perform motion-aware deblurring of the long exposure image 436 based on the motion information 445. For example, a motion-aware deblurring network may be configured to provide a deblurred image from the long exposure image 436 based on the provided motion information 445. In some embodiments, the motion-aware deblurring network may also provide deblurring features 455. The deblurring features 455 may refer to intermediate results (or embeddings) obtained from the motion-aware deblurring network before predictions are made at the last layer of the motion-aware deblurring network. The deblurring features 455 may embed information about the blurring artifacts of the long exposure image 436.

At block 460, the method 400 may perform denoising of the short exposure image burst 434 based on the motion information 445. For example, a burst denoising network may be configured to denoise the short exposure image burst 434 based on the provided motion information 445. In some embodiments, the burst denoising network may also provide denoising features 465. The denoising features 465 may refer to intermediate results (or embeddings) obtained from the burst denoising network before predictions are made at the last layer of the burst denoising network. The denoising features 465 may embed information about the noise artifacts of the short exposure image burst 434.

At block 470, the method 400 may fuse the deblurring features 455 and the denoising features 465 to reconstruct the clean and sharp image 475.

Figure 5:
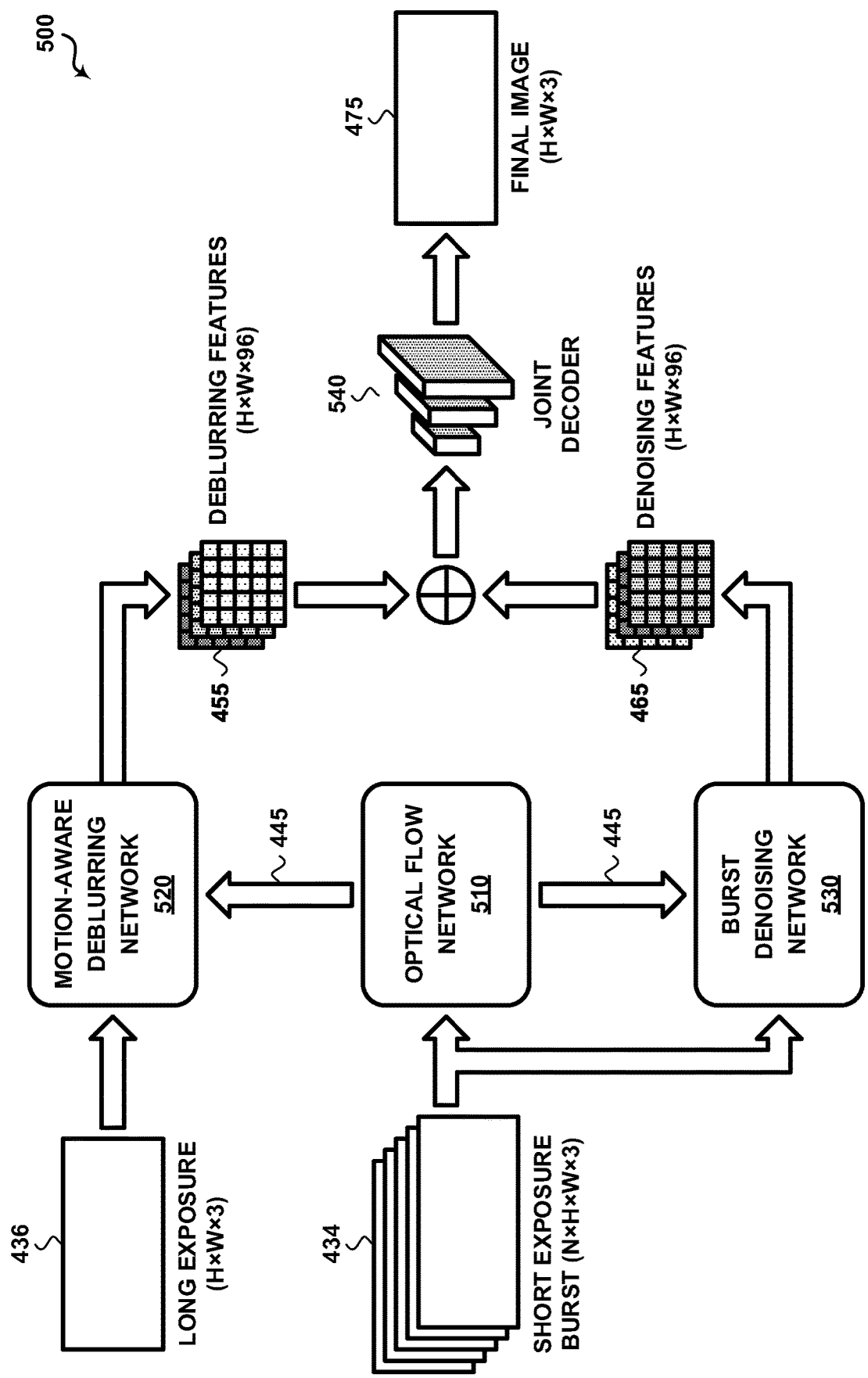
FIG. 5 depicts an example of a block diagram of an image processing framework for performing joint denoising and deblurring, in accordance with various aspects of the present disclosure.

FIG. 5 depicts an example of a block diagram of an image processing framework for performing joint denoising and deblurring, in accordance with various aspects of the present disclosure.

Referring to FIG. 5, a block diagram of an image processing framework 500 for performing joint denoising and deblurring that implements one or more aspects of the present disclosure is illustrated. In some embodiments, at least a portion of the operations and/or functions depicted by the image processing framework 500 may be performed by the device 100 of FIG. 1, which may include the deblurring/denoising component 180. Alternatively or additionally, another computing device (e.g., a server, a laptop, a smartphone, a UE, a wearable device, and the like) that includes the deblurring/denoising component 180 may perform at least a portion of the operations and/or functions depicted by the image processing framework 500. For example, in some embodiments, the device 100 and the other computing device may perform the operations and/or functions depicted by the image processing framework 500 in conjunction. That is, the device 100 may perform a portion of the image processing framework 500 and a remaining portion of the image processing framework 500 may be performed by one or more other computing devices.

In some embodiments, the image processing framework 500 depicted in FIG. 5 may be used to implement the method 400 described with reference to FIG. 4 and may include additional features not mentioned above.

Referring to FIG. 5, a short exposure image burst 434 may be provided to an optical flow network 510 as an input. In some embodiments, the short exposure image burst 434, $\{S_i\}_{i=1}^{N}$, may include a plurality of N images (e.g., sRGB images) having a resolution of H×W pixels and a feature channel count of three (3) (e.g., N×H×W×3). For example, N may be equal to five (5) (e.g., the short exposure image burst 434 consists of five (5) images), as such a data modality may be available in mobile devices (e.g., smartphones). However, the present disclosure is not limited in this regard. That is, the short exposure image burst 434 may consist of more images (e.g., N>5) or fewer images (e.g., N<5) than five (5) images.

The optical flow network 510 may be configured and/or trained to estimate the motion of objects in the short exposure image burst 434 and/or the movement of an image sensor capturing the short exposure image burst 434. For example, the optical flow network 510 may determine the movement of pixels and/or features in the short exposure image burst 434. In some embodiments, the optical flow network 510 may employ an exposure trajectory model that may characterize how a point may be displaced from a reference frame at different time steps. That is, the optical flow network 510 may predict relative motion offsets between images (frames) of the short exposure image burst 434. The motion information 445 generated by the optical flow network 510 may be provided to the motion-aware deblurring network 520 for performing a deblurring operation on the long exposure image 436 based on the motion information 445. Alternatively or additionally, the motion information 445 may also be provided to the burst denoising network 530 to perform a denoising operation on the short exposure image burst 434 based on the motion information 445. The optical flow network 510 is described in further detail with reference to FIG. 6.

As shown in FIG. 5, the motion-aware deblurring network 520 may be provided with the long exposure image 436 as an input. The long exposure image 436, L, may consist of an image (e.g., sRGB image) having a resolution of H×W pixels and a feature channel count of three (3) (e.g., H×W× 3), L. As described with reference to FIG. 3, the long exposure image 436 and the short exposure image burst 434 may have been synchronously captured during a substantially similar and/or the same time period (e.g., $\Delta t_j$).

The motion-aware deblurring network 520 may be configured and/or trained to perform a deblurring operation on the long exposure image 436 based on the motion information 445 provided by the optical flow network 510. For example, the long exposure image 436 may be blurry due to a motion (e.g., of the camera and/or image sensor, and/or one or more objects in the image) that may be aligned with a motion trajectory indicated by the motion information 445, as described with reference to FIGS. 8A and 8B. Consequently, since the motion trajectory for a point in the long exposure image 436 may be known, the deblurring operation performed by the motion-aware deblurring network 520 may be achieved by interpolating the motion information 445 along the trajectory. In some embodiments, the motion-aware deblurring network 520 may be configured to provide a deblurred image from the long exposure image 436 based on the motion information 445. In some optional or additional embodiments, the motion-aware deblurring network 520 may be configured to provide deblurring features 455. The deblurring features 455 may refer to intermediate results (or embeddings) obtained from the motion-aware deblurring network 520 before predictions are made at the last layer of the motion-aware deblurring network 520. The deblurring features 455 may embed information about the blurring artifacts of the long exposure image 436. The motion-aware deblurring network 520 is described in further detail with reference to FIGS. 7A to 7D.

Continuing to refer to FIG. 5, the burst denoising network 530 may be configured and/or trained to perform a denoising operation on the short exposure image burst 434 based on the based on the motion information 445 provided by the optical flow network 510. For example, the short exposure image burst 434 may be noisy due to a low photon count. Consequently, since the motion trajectory for a point in the short exposure image burst 434 may be known, the denoising operation performed by the burst denoising network 530 may be achieved by interpolating the motion information 445 along the trajectory. In some embodiments, the burst denoising network 530 may be configured to provide a denoised image from the short exposure image burst 434 based on the motion information 445. In some optional or additional embodiments, the burst denoising network 530 may be configured to provide denoising features 465. The denoising features 465 may refer to intermediate results (or embeddings) obtained from the burst denoising network 530 before predictions are made at the last layer of the burst denoising network 530. The denoising features 465 may embed information about the noise artifacts of the short exposure image burst 434. The burst denoising network 530 is described in further detail with reference to FIG. 9.

As shown in FIG. 5, the deblurring features 455 and the denoising features 465 may be concatenated into a single feature map and may be provided to a joint decoder 540. The joint decoder 540 may be configured and/or trained to fuse the deblurring features 455 and the denoising features 465 to reconstruct a final clean and sharp image 475.

In some embodiments, the components of the image processing framework 500 (e.g., the optical flow network 510, the motion-aware deblurring network 520, the burst denoising network 530, and the joint decoder 540) may be trained in an end-to-end fashion as described with reference to FIG. 11. The training of the components of the image processing framework 500 may be performed using synthetic data that may be constructed in a manner similar to the embodiments described with reference to FIG. 10. Alternatively or additionally, the training of the components of the image processing framework 500 may be performed using real data obtained using a hardware-synchronized dual-camera system.

Having discussed an example image processing framework 500 that may be used to perform joint denoising and deblurring by an image processing framework, FIGS. 6 to 11 illustrate example process flows and block diagrams of components that may be used with the image processing framework 500 to perform the joint denoising and deblurring during test time and to train the image processing framework 500, in accordance with various aspects of the present disclosure.

Figure 6:
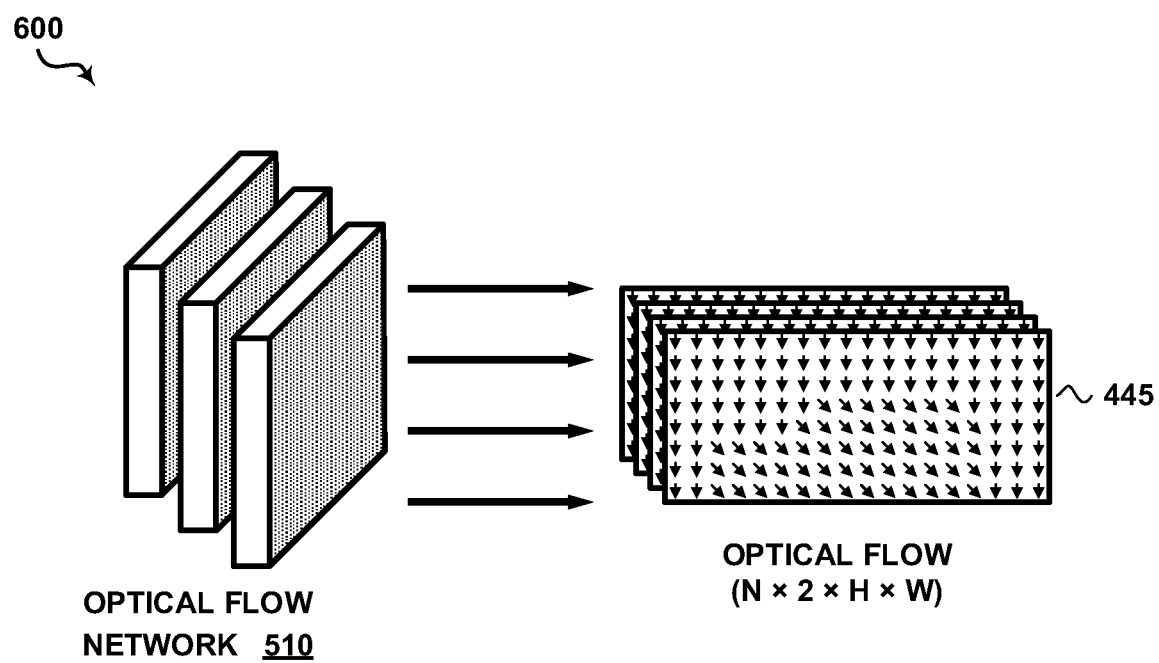
FIG. 6 illustrates an example of an optical flow network, in accordance with various aspects of the present disclosure.

FIG. 6 illustrates an example of an optical flow network, in accordance with various aspects of the present disclosure.

Referring to FIG. 6, a block diagram 600 of the optical flow network 510 that implements one or more aspects of the present disclosure is illustrated. In some embodiments, at least a portion of the operations and/or functions depicted by the block diagram 600 may be performed by the device 100 of FIG. 1, which may include the deblurring/denoising component 180. Alternatively or additionally, another computing device (e.g., a server, a laptop, a smartphone, a UE, a wearable device, and the like) that includes the deblurring/denoising component 180 may perform at least a portion of the operations and/or functions depicted by the block diagram 600. For example, in some embodiments, the device 100 and the other computing device may perform the operations and/or functions depicted by the block diagram 600 in conjunction. That is, the device 100 may perform a portion of the block diagram 600 and a remaining portion of the block diagram 600 may be performed by one or more other computing devices.

The optical flow network 510 may be configured and/or trained to estimate the motion of objects in the short exposure image burst 434. That is, the optical flow network 510 may be configured to recover motion information 445 from the short exposure image burst 434. The motion of the objects may be caused by at least one of motion of the objects during the exposure time interval of the short exposure image burst 434 and motion of the camera and/or image sensor during the capture of the short exposure image burst 434.

In some embodiments, the optical flow network 510 may generate a plurality of optical flows based on the short exposure image burst 434. The plurality of optical flows may include a motion offset (e.g., a two-dimensional (2D) vector) between each pixel in a corresponding image in the short exposure image burst 434 and a reference image of the short exposure image burst 434. Assuming that each image of the N images in the short exposure image burst 434 has a resolution of H×W pixels, then the plurality of optical flows may have a size of N×2×H×W. The optical flow network 510 may predict relative motion offsets between a reference image (frame) of the short exposure image burst 434 and remaining (e.g., N−1) images (frames) of the short exposure image burst 434 based on the plurality of optical flows. In some embodiments, the optical flow network 510 may generate the motion information 445 based on the predicted plurality of optical flows. That is, the motion information 445 may include the plurality of optical flows.

In some embodiments, the optical flow network 510 may be and/or may include a convolutional neural network (CNN), such as, but not limited to, a PWC-Net. However, the present disclosure is not limited in this regard. For example, the optical flow network 510 may include other types of neural networks and/or two or more neural networks without deviating from the scope of the present disclosure. In some embodiments, the optical flow network 510 may include a first CNN (e.g., PWC-Net) configured and/or trained to compute the motion information 445 and a second CNN (e.g., PWC-Net) configured and/or trained to align the short exposure image burst 434 to the long exposure image 436 and/or to spatially and/or temporally align a first camera used to capture the short exposure image burst 434 and a second camera used to capture the long exposure image 436.

Figure 7A:
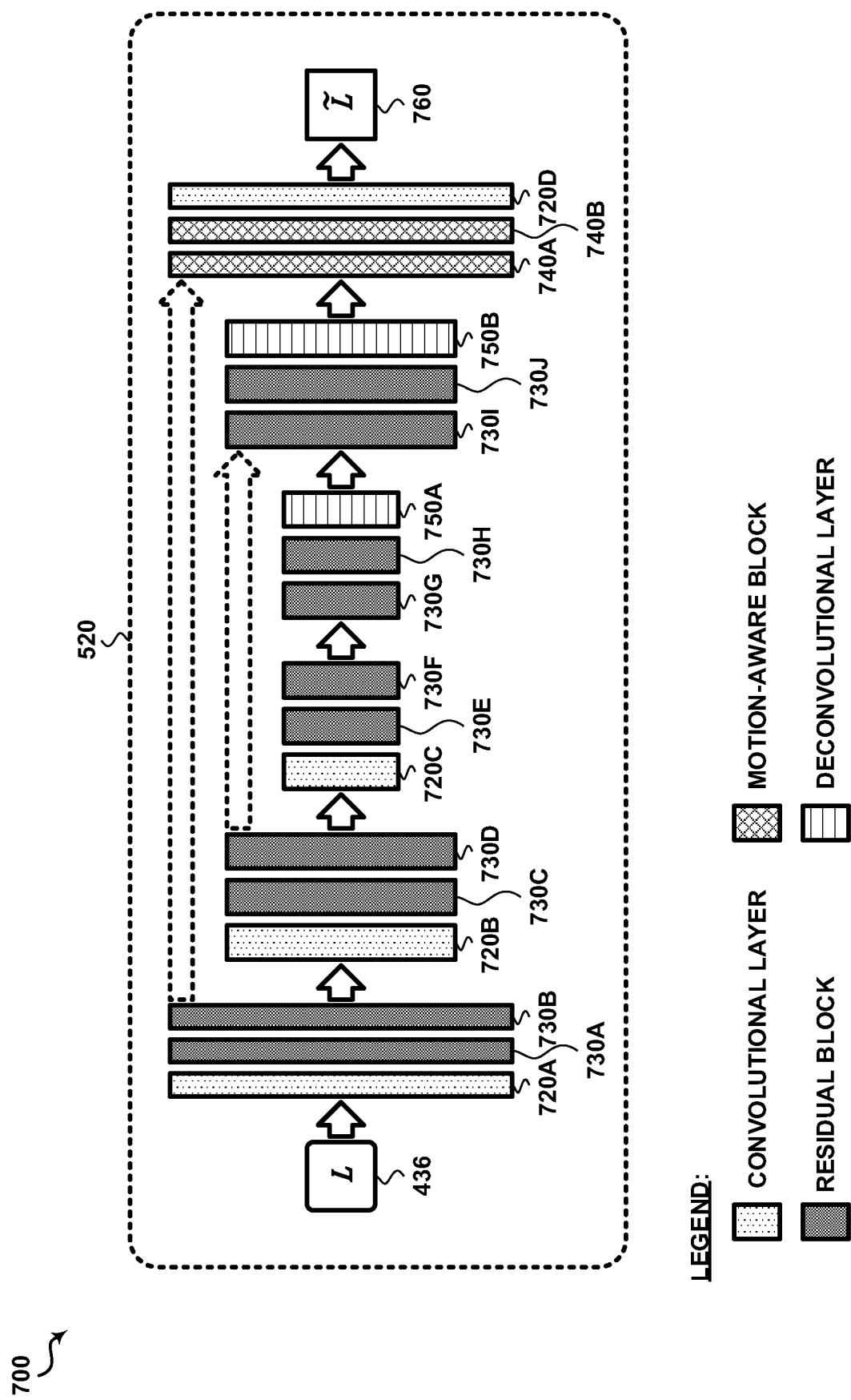
FIG. 7A depicts an example of a block diagram of a motion-aware deblurring network, in accordance with various aspects of the present disclosure.
Figures 7B, 7C:
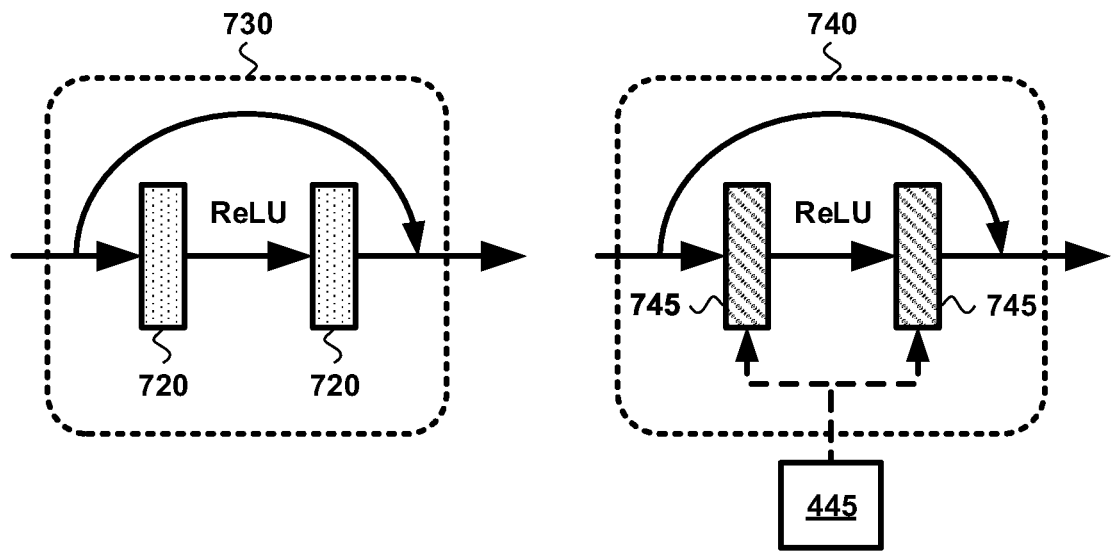
FIG. 7B illustrates an example of a residual block of the motion-aware deblurring network, in accordance with various aspects of the present disclosure.
FIG. 7C depicts an example of a motion-aware block of the motion-aware deblurring network, in accordance with various aspects of the present disclosure.
Figure 7D:
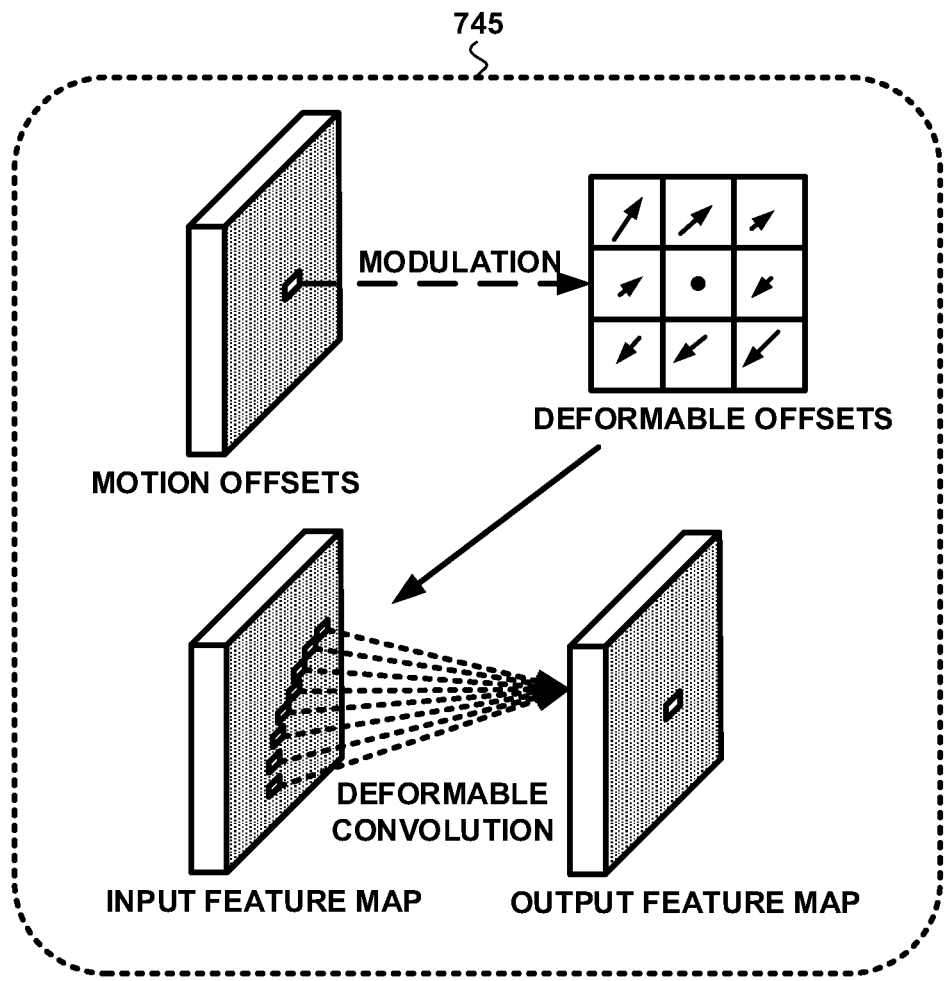
FIG. 7D illustrates an example of a motion-aware convolution block of the motion-aware block, in accordance with various aspects of the present disclosure.

FIGS. 7A to 7D illustrate an example of a motion-aware deblurring network 520, in accordance with various aspects of the present disclosure. In particular, FIG. 7A depicts an example of a block diagram of the motion-aware deblurring network 520, in accordance with various aspects of the present disclosure. FIG. 7B illustrates an example of a residual block of the motion-aware deblurring network 520, in accordance with various aspects of the present disclosure. FIG. 7C depicts an example of a motion-aware block of the motion-aware deblurring network 520, in accordance with various aspects of the present disclosure. FIG. 7D illustrates an example of a motion-aware convolution in the motion-aware block, in accordance with various aspects of the present disclosure.

Referring to FIG. 7A, a block diagram 700 of the motion-aware deblurring network 520 that implements one or more aspects of the present disclosure is illustrated. In some embodiments, at least a portion of the motion-aware deblurring network 520 may be performed by the device 100 of FIG. 1, which may include the deblurring/denoising component 180. Alternatively or additionally, another computing device (e.g., a server, a laptop, a smartphone, a UE, a wearable device, and the like) that includes the deblurring/denoising component 180 may perform at least a portion of the motion-aware deblurring network 520. For example, in some embodiments, the device 100 and the other computing device may perform the operations and/or functions depicted by the block diagram 700 in conjunction. That is, the device 100 may perform a portion of the motion-aware deblurring network 520 and a remaining portion of the motion-aware deblurring network 520 may be performed by one or more other computing devices.

The motion-aware deblurring network 520 may be configured and/or trained to perform motion-aware deblurring of the long exposure image 436, L, based on the motion information 445. That is, the motion-aware deblurring network 520 may be configured to deblur the long exposure image 436 by interpolating the motion information 445 along the trajectory obtained by the optical flow network 510 from the short exposure image burst 434. In some embodiments, the motion-aware deblurring network 520 may be configured to provide a deblurred image 760, L, from the long exposure image 436, L, based on the motion information 445. In some optional or additional embodiments, the motion-aware deblurring network 520 may be configured to provide deblurring features 455. The deblurring features 455 may refer to intermediate results (or embeddings) obtained from the motion-aware deblurring network 520 before predictions are made at the last layer of the motion-aware deblurring network 520. The deblurring features 455 may embed information about the blurring artifacts of the long exposure image 436.

In some embodiments, the motion-aware deblurring network 520 may be and/or may include a convolutional neural network (CNN), such as, but not limited to, a motion-exposure trajectory recovery (Motion-ETR) network. However, the present disclosure is not limited in this regard. For example, the motion-aware deblurring network 520 may include other types of neural networks and/or two or more neural networks without deviating from the scope of the present disclosure. As another example, the architecture of the motion-aware deblurring network 520 may be based on the architecture of a deep multi-patch hierarchical network (DMPHN).

As shown in FIG. 7A, the motion-aware deblurring network 520 may consist of an encoder-decoder residual architecture including convolutional layers (e.g., first convolutional layer 720A, second convolutional layer 720B, third convolutional layer 720C, and fourth convolutional layer 720D, hereinafter generally referred to as "720"), residual blocks (e.g., first residual block 730A, second residual block 730B, third residual block 730C, fourth residual block 730D, fifth residual block 730E, sixth residual block 730F, seventh residual block 730G, eighth residual block 730H, ninth residual block 730I, and tenth residual block 730J, hereinafter generally referred to as "730"), motion-aware blocks (e.g., first motion-aware block 740A and second motion-aware block 740B, hereinafter generally referred to as "740"), and deconvolutional layers (e.g., first deconvolutional layer 750A and deconvolutional layer 750B, hereinafter generally referred to as "750").

Although the motion-aware deblurring network 520 is depicted in FIG. 7A as including four (4) convolutional layers 720 (e.g., 720-720D), ten (10) residual blocks 730 (e.g., 730A-730J), two (2) motion-aware blocks 740 (e.g., 740A-740B), and two (2) deconvolutional layers 750 (e.g., 750A-750B), it may be understood that the present disclosure is not limited in this regard. That is, the motion-aware deblurring network 520 may include fewer layers and/or blocks and/or more layers and/or blocks than those depicted in FIG. 7A.

Referring to FIG. 7B, an example of a residual block 730 of the motion-aware deblurring network 520 is illustrated. As shown in FIG. 7B, the residual block 730 may include two (2) convolutional layers 720 in between which a rectified linear unit (ReLU) function may be performed.

Referring to FIG. 7C, an example of a motion-aware block 740 of the motion-aware deblurring network 520 is depicted. As shown in FIG. 7C, the motion-aware block 740 may include two (2) motion-aware deformable convolution blocks 745 in between which a ReLU function may be performed.

The long exposure image 436 may, according to some embodiments, include motion blur that may be non-uniform (e.g., multiple magnitudes, multiple directions). Consequently, a deblurring operation for removing and/or reducing the motion blur of the long exposure image 436 may need to use spatially varying kernels. That is, the deblurring operation may need to be performed by a fully-convolutional deblurring network that may incorporate motion information (e.g., motion information 445) to adaptively modulate the shape of the convolution kernels. For example, the deblurring of the long exposure image 436 may need to be performed using filters having a similar direction and/or shape as the deblurred image (e.g., blur kernel). In some embodiments, the motion-aware deblurring network 520 may utilize an exposure trajectory model to determine the shape of the filters.

Referring to FIG. 7D, an example of a motion-aware deformable convolution block 745 of the motion-aware block 740 is illustrated. As shown in FIG. 7D, the motion-aware deformable convolution block 745 may use the motion information 445 to model the filter deformations. In some embodiments, the motion-aware convolution of the motion-aware deformable convolution block 745 may be represented by an equation similar to Equation 3.

$$y(p_m) = \sum_{i=0}^{N} w(p_i) \cdot x(p_m + \Delta p_i) \quad \text{[Eq. 3]}$$

Referring to Equation 3, x may represent an input feature map, y may represent an output feature map, and w may represent the weight of the convolution filter. The coordinate $p_m + \Delta p_i$ may represent the sampling location calculated by the reference coordinate $p_m$ and an offset $\Delta p_i$, which may control the shape and/or size of the convolution, and $w(p_i)$ may represent the weight corresponding to the sampling point $p_m+\Delta p_i$. For a square-shaped K×K convolutional filter (e.g., K may be equal to three (3)), $\Delta p_i \in (-1,-1), (-1, 0), \ldots, (0, 1), (1, 1)$. However, in the motion-aware convolution, $\Delta p_i$ may be determined based on the motion information 445. For example, given a recovered exposure trajectory, the motion-aware deformable convolution block 745 may calculate $K^2 \Delta p_i$ centered by the reference offset $\Delta p_m=(0, 0)$ to modulate the original K×K kernel, as shown in FIG. 7D. Consequently, the motion-aware deformable convolution block 745 may take advantage of the motion information 445 (e.g., both direction and magnitude), which may result in a more accurate deconvolution when compared to related deconvolution techniques.

Figure 8A:
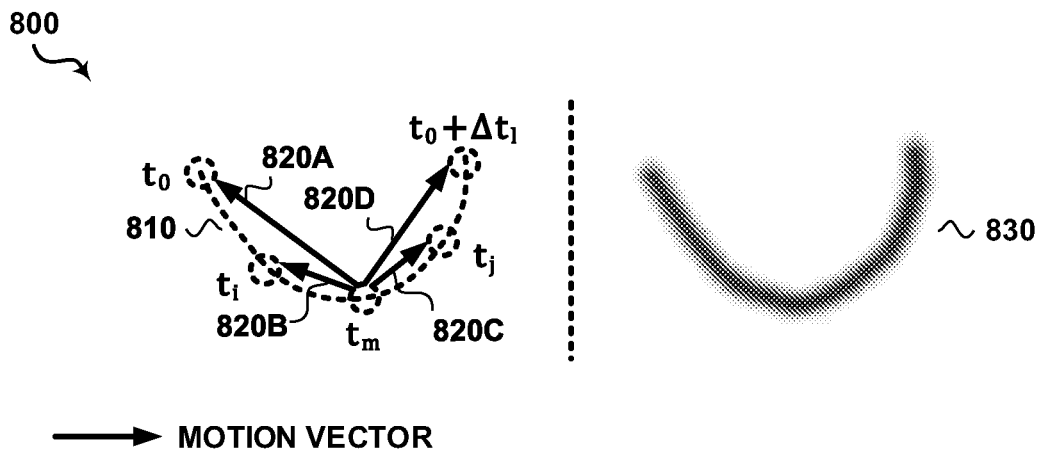
FIG. 8A depicts an example of an exposure trajectory, in accordance with various aspects of the present disclosure.

FIG. 8A depicts an example of an exposure trajectory, in accordance with various aspects of the present disclosure. Referring to FIG. 8A, an exposure trajectory 810 of a single moving point in a scene is illustrated. In some embodiments, the exposure trajectory 810 may characterize how a point is displaced from a reference frame at different time steps. That is, the motion information 445 may be obtained by obtaining discrete samples of motion vectors of a plurality of points $p_i$ in each image of the short exposure image burst 434 relative to a reference position $p_m$ at a reference time step $t_m$, and interpolating, for each corresponding point of the plurality of points $p_i$, the discrete samples of the corresponding point along a motion trajectory 810 of the corresponding point. That is, the motion information 445 may be obtained by obtaining N motion vectors for each pixel $p_i$ in each image of the short exposure image burst 434 and interpolating the N motion vectors to obtain $K^2$ vectors with which to modulate a K×K kernel. For example, when N=5 and K=3, the motion information 445 may be obtained by interpolating five (5) motion offsets to obtain four (4) additional motion offsets to result in a total of nine (9) (e.g., $K^2=3^2=9$) with which to fill a 3×3 kernel.

In some embodiments, during capture of the long exposure image 436 (e.g., from $t_0$ to $t_0+\Delta t_l$), the relatively long exposure time may yield a blurry streak 830 that may be aligned with the exposure trajectory 810. Since the exposure trajectory 810 for a point may be known (e.g., as indicated by the motion information 445), deblurring may be achieved by interpolating the motion information 445 along the exposure trajectory 810.

In some embodiments, recovery of a trajectory for a given point (e.g., pixel) may include obtaining spatial offsets that may indicate shifts from a reference time step (e.g., $t_m$) to other time steps (e.g., first time step $t_0$, second time step $t_i$, third time step $t_j$, and fourth time step $t_0+\Delta t_l$). Since the capture of the long exposure image 436 may be temporally synchronized with the capture of the short exposure image burst 434, the motion information 445 extracted from the short exposure image burst 434 may be used to obtain discrete samples of the motion vectors (e.g., first motion vector 820A, second motion vector 820B, third motion vector 820C, and fourth motion vector 820D, hereinafter generally referred to as "820"). For example, the first motion vector 820A may indicate the spatial offset from the reference time step $t_m$ to the first time step $t_0$, the second motion vector 820B may indicate the spatial offset from the reference time step $t_m$ to the second time step $t_i$, the third motion vector 820C may indicate the spatial offset from the reference time step $t_m$ to the third time step $t_j$, and the fourth motion vector 820D may indicate the spatial offset from the reference time step $t_m$ to the fourth time step $t_0+\Delta t_l$.

In particular, for a pixel p in a reference frame $S_m$, the motion to an arbitrary frame $S_i$ may be represented by an equation similar to Equation 4.

$$S_m(p) = S_i(p + \Delta p_i) \quad \text{[Eq. 4]}$$

Figure 8B:
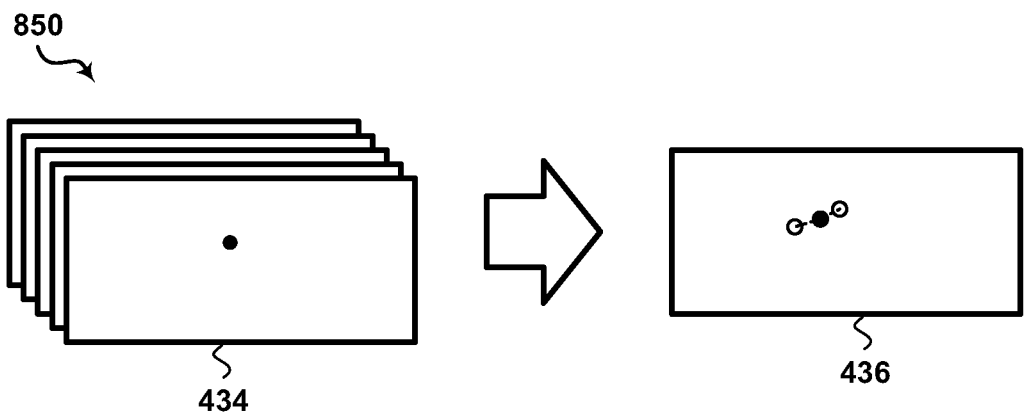
FIG. 8B illustrates an example of motion-aware image deblurring using motion information, in accordance with various aspects of the present disclosure.

Referring to Equation 4, $\Delta p_i$ may represent the motion vector for the pixel p. As shown in FIG. 8A, the time-dependent motion vectors across the exposure time (e.g., from $t_0$ to $t_0+\Delta t_l$), $\Delta p=\{\Delta p_i\}_{i=1}^N$, may describe the exposure trajectory 810 of the corresponding pixel p. Advantageously, since the motion information 445 may have been generated by the optical flow network 510 based on the short exposure image burst 434, the exposure trajectory 810 may be more accurate than an exposure trajectory obtained from the long exposure image 436 that may be blurry. For example, as shown in FIG. 8B, the motion-aware deblurring network 520 may use the motion information computed by the optical flow network 510 from the short exposure image burst 434 to perform the motion-aware deblurring operation on the long exposure image 436.

In some embodiments, the motion vectors 820 may be linearly interpolated into a trajectory with $K^2$ points and/or reshaped into K×K deformable convolution kernels. Consequently, the convolution kernels may have spatially varying support across the image domain. Alternatively or additionally, the last convolution at each level of the motion-aware deblurring network 520 may be deformable.

Returning to FIG. 7A, the motion-aware deblurring operation of the motion-aware deblurring network 520 may be represented by an equation similar to Equation 5.

$$\hat{L} = FD\big(L, \{\Delta p_i\}_{i=1}^N; \theta_{FD}\big), \Delta p_i = F(S_i, S_m) \quad \text{[Eq. 5]}$$

Referring to Equation 5, $L \in \mathbb{R}^{H \times W \times 3}$ may represent the long exposure image 436, FD may represent the motion-aware deblurring operation parameterized by $\theta_{FD}$ and the optical flow network 510, F, that may provide motion vectors, $\Delta p_i \in \mathbb{R}^{H \times W \times 2}$, computed between short exposure images $S_i$ and the reference frame $S_m$.

Figure 9:
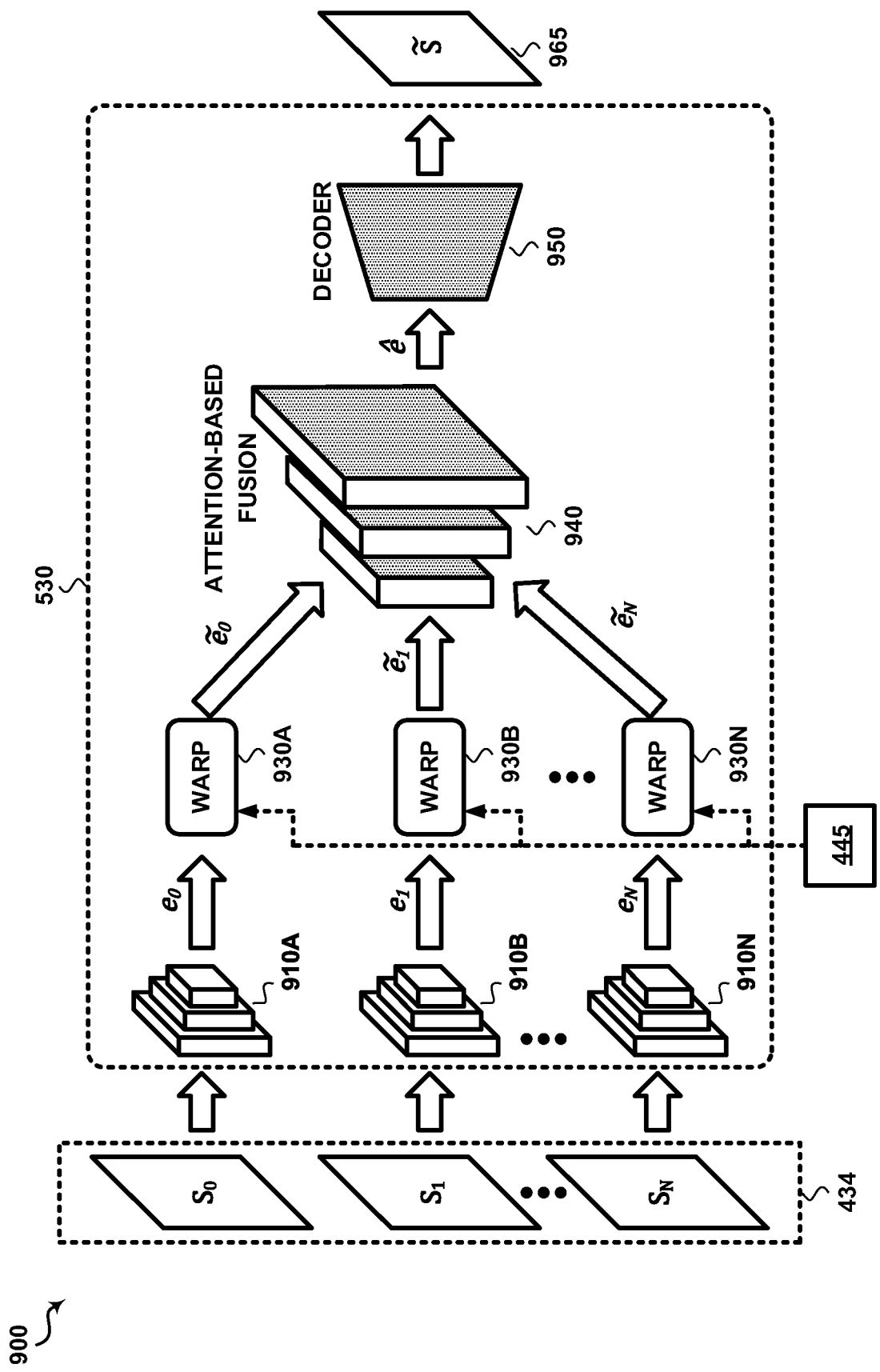
FIG. 9 depicts an example of a block diagram of a burst denoising network, in accordance with various aspects of the present disclosure.

FIG. 9 depicts an example of a block diagram of a burst denoising network, in accordance with various aspects of the present disclosure. Referring to FIG. 9, a block diagram 900 of the burst denoising network 530 that implements one or more aspects of the present disclosure is illustrated. In some embodiments, at least a portion of the burst denoising network 530 may be performed by the device 100 of FIG. 1, which may include the deblurring/denoising component 180. Alternatively or additionally, another computing device (e.g., a server, a laptop, a smartphone, a UE, a wearable device, and the like) that includes the deblurring/denoising component 180 may perform at least a portion of the burst denoising network 530. For example, in some embodiments, the device 100 and the other computing device may perform the operations and/or functions depicted by the block diagram 900 in conjunction. That is, the device 100 may perform a portion of the burst denoising network 530 and a remaining portion of the burst denoising network 530 may be performed by one or more other computing devices.

The burst denoising network 530 may be configured and/or trained to perform denoising of the short exposure image burst 434, $\{S_i\}_{i=1}^N$, based on the motion information 445. That is, the burst denoising network 530 may be configured to denoise the short exposure image burst 434 to provide a denoised image 965, Š, based on the motion information 445. In some optional or additional embodiments, the burst denoising network 530 may be configured to provide denoising features 465. The denoising features 465 may refer to intermediate results (or embeddings) obtained from the burst denoising network 530 before predictions are made at the last layer of the burst denoising network 530. The denoising features 465 may embed information about the blurring artifacts of the short exposure image burst 434.

In some embodiments, the burst denoising network 530 may be and/or may include a convolutional neural network (CNN), such as, but not limited to, a deep burst super-resolution (DBSR) network. However, the present disclosure is not limited in this regard. For example, the burst denoising network 530 may include other types of neural networks and/or two or more neural networks without deviating from the scope of the present disclosure. As another example, the DBSR network of the burst denoising network 530 may be modified to accept sRGB images as input for the burst denoising operation.

As shown in FIG. 9, the burst denoising network 530 may include encoders (e.g., first encoder 910A, second encoder 910B, to N-th encoder 910N, hereinafter generally referred to as "910"), warping components (e.g., first warping component 930A, second warping component 930B, to N-th warping component 930N, hereinafter generally referred to as "930"), an attention-based fusion network 940, and a decoder 950.

Each encoder 910, Enc, may be separately applied to each image $S_i$ of the short exposure image burst 434, $\{S_i\}_{i=1}^{N}$, to obtain individual feature representations, $e_i = Enc(S_i)$, for each image $S_i$. That is, each encoder 910 may independently map each image $S_i$ to a deep feature representation $e_i$. In some embodiments, the encoder 910 may expand the feature dimensionality of a final convolutional layer to potentially achieve a relatively high D-dimensional encoding that may allow for effective fusion of several frames. For example, D may be equal to 96.

Each warping component 930 may warp each image $S_i$ of the short exposure image burst 434 to the reference frame $S_m$ in order to spatially align the images in the short exposure image burst 434. That is, the images in the short exposure image burst 434 may be spatially misaligned due to motion of the camera and/or image sensor and/or motion of one or more objects in the scene represented by the short exposure image burst 434. In order to effectively fuse the deep feature representations et, the warping components 930 may warp the corresponding deep feature representations $e_i$ based on the motion information 445 generated by the optical flow network 510. For example, the warping operation performed by the warping component 930 may be represented by an equation similar to Equation 6.

$$\tilde{e}_i = \phi(e_i, \Delta p_i) \qquad [Eq. 6]$$

Referring to Equation 6, $\phi$ may represent a backward operation with bilinear interpolation.

In some embodiments, the attention-based fusion network 940 may combine the warped (aligned) deep feature representations $\tilde{e}_i$ across the short exposure image burst 434 to generate a final fused feature representation $\hat{e} \in \mathbb{R}^{H \times W \times D}$. For example, the attention-based fusion network 940 may adaptively extract information the short exposure image burst 434 while allowing for an arbitrary number of images (e.g., N) as input. That is, a weight predictor W may be conditioned (e.g., trained) on warped features $\tilde{e}_i$ and motion vectors $\Delta p_i$ to return (or provide) unnormalized log attention weights, $\tilde{W}_i \in \mathbb{R}^{H \times W \times D}$, for each warped encoding $\tilde{e}_i$. The fused feature map may be represented by a weighted sum equation similar to Equation 7.

$$\hat{e} = \sum_{i=1}^{N} \frac{\exp(\tilde{w}_i)}{\sum_j \exp(\tilde{w}_j)} \tilde{e}_i \qquad [Eq. 7]$$

The decoder 950 may reconstruct the final denoised version 965 of the reference image from the fused feature map, $\tilde{S} = Dec(\hat{e})$. The decoder 950 may use a similar architecture as the decoder of the DBSR network. However, the present disclosure is not limited in this regard. For example, the decoder 950 may omit at least one upsampling layer from the decoder of the DBSR network.

Consequently, the burst denoising operations of the burst denoising network 530 may be represented by an equation similar to Equation 8.

$$\tilde{S} = BD(\{S_i\}_{i=1}^{N}; \theta_{BD}) \qquad [Eq. 8]$$

Referring to Equation 8, BD may represent the burst denoising network 530, $\tilde{S} \in \mathbb{R}^{H \times W \times 3}$, may represent the denoised image 965 provided by the burst denoising network 530, and $\theta_{BD}$ may represent the learnable parameters of the burst denoising network 530. That is, $\theta_{BD}$ may represent the learnable parameters of the encoders 910, the warping components, the attention-based fusion network 940, and the decoder 950.

Returning to FIG. 5, the joint decoder 540 may be and/or may include a learnable component (e.g., a CNN) that may be configured and/or trained to combine information from the motion-aware deblurring network 520 (e.g., the deblurring features 455) with information from the burst denoising network 530 (e.g., the denoising features 465) to produce a final image 475. For example, the joint decoder 540 may receive intermediate feature representations (e.g., embeddings) from the motion-aware deblurring network 520 and the burst denoising network 530 that may have been concatenated into a single feature map. The joint decoder 540 may be further configured to decode the input feature map into the final image 475.

In some embodiments, the motion-aware deblurring network 520 may include a three-level hierarchical deblurring network. In such embodiments, the penultimate features of the decoders at the three (3) levels may be selected to be included in the deblurring features 455. As a result, the deblurring features 455 may include a deblurring feature map of total dimension $D_1$ (e.g., $D_1 = 32 \times 3 = 96$). Alternatively or additionally, the denoising features 465 may include the fused feature map e of dimension $D_2$ (e.g., $D_2 = 96$).

In some embodiments, the joint decoder 540 may include at least one convolutional layer that may merge the features of the deblurring features 455 and the denoising features 465 into D features (e.g., D=96). Alternatively or additionally the joint decoder 540 may include a decoder (and/or decoder layer) that may be configured to generate the final image 475 from the D merged features. That is, the joint decoder 540 may be represented by an equation similar to Equation 9.

$$J = Dec(concat(d, e); \theta_J) \quad \text{[Eq. 9]}$$

Referring to Equation 9, concat may represent the concatenation operation, $d \in \mathbb{R}^{H \times W \times 96}$ may represent the deblurring features 455, and Dec may represent the joint decoder 540 as parameterized by the $\theta_j$ learnable parameters of the joint decoder 540.

Figure 10:
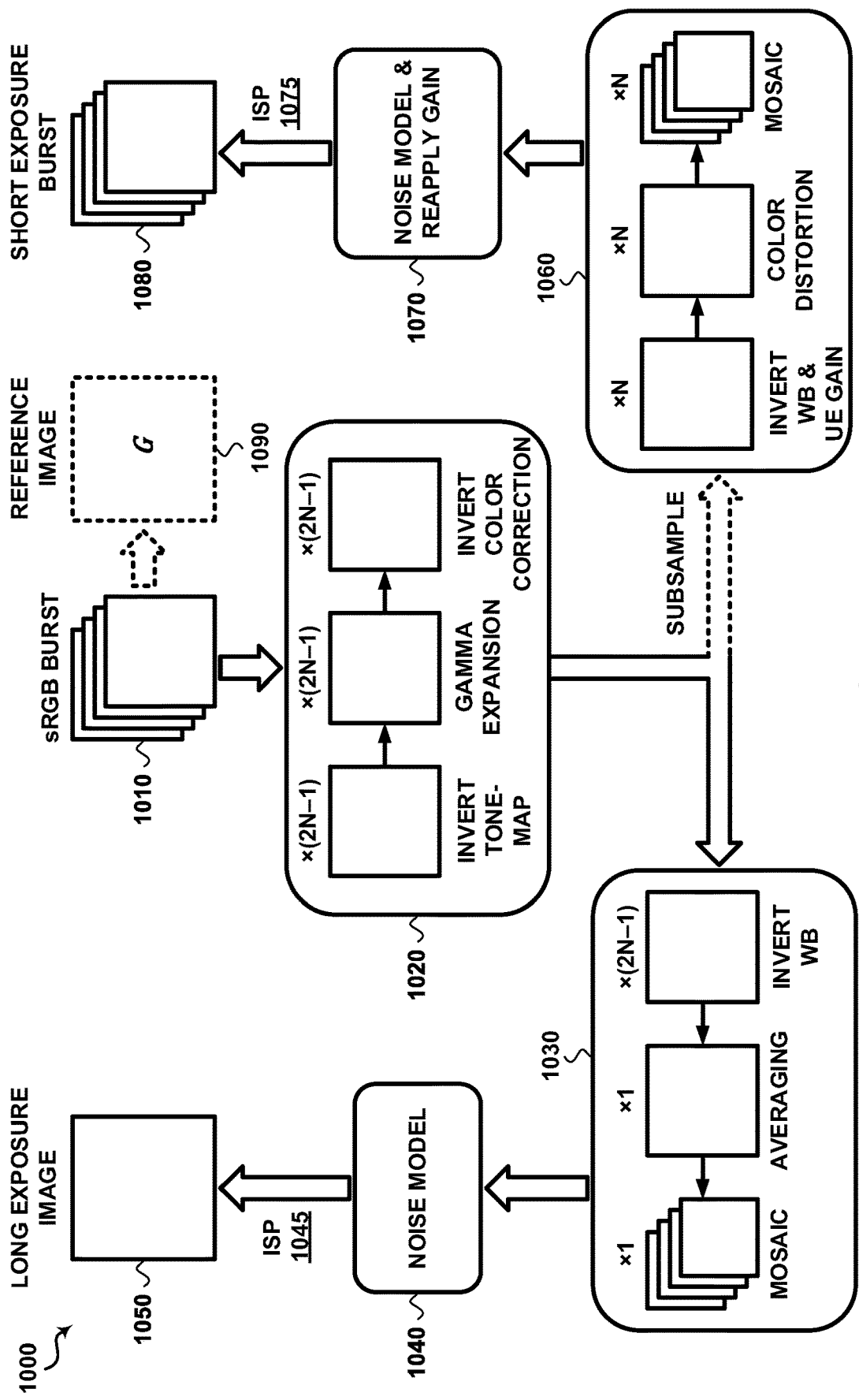
FIG. 10 illustrates an example data generation pipeline for synthesizing training data, in accordance with various aspects of the present disclosure.

FIG. 10 illustrates an example data generation pipeline for synthesizing training data, in accordance with various aspects of the present disclosure. Referring to FIG. 10, and data generation pipeline 1000 for synthesizing training data is illustrated.

In some embodiments, at least a portion of the data generation pipeline 1000 may be performed by the device 100 of FIG. 1, which may include the deblurring/denoising component 180. Alternatively or additionally, another computing device (e.g., a server, a laptop, a smartphone, a UE, a wearable device, and the like) that includes the deblurring/denoising component 180 may perform at least a portion of the data generation pipeline 1000. For example, in some embodiments, the device 100 and the other computing device may perform the operations and/or functions depicted by the data generation pipeline 1000 in conjunction. That is, the device 100 may perform a portion of the data generation pipeline 1000 and a remaining portion of the data generation pipeline 1000 may be performed by one or more other computing devices.

As shown in FIG. 10, the data generation pipeline 1000 may create a dataset of synthetic synchronized pairs of long exposure images 1050 and short exposure image bursts 1080 from a sRGB image burst 1010 that may be provided as an input. In some embodiments, the sRGB image burst 1010 may be obtained from a publicly-available dataset, such as, but not limited to, the GoPro dataset that may contain high frame rate videos with a 720×1280 resolution. However, the present disclosure is not limited in this regard. Notably, the aspects presented herein may be employed with any dataset containing clean short exposure images (e.g., with sufficient light exposure and/or brightness) in which one of the images maybe used as a ground-truth image.

In operation 1020, the data generation pipeline 1000 may obtain a burst of 2N−1 consecutive sRGB frames 1010 from the GoPro dataset, for example. The data generation pipeline 1000, in operation 1020, may invert tone-mapping, gamma compression, and color correction on each image of the sRGB image burst 1010. That is, operation 1020 may invert (or reverse) the processing performed by an ISP on the images of the sRGB image burst 1010 to generate synthetic RAW images.

After operation 1020, the data generation pipeline 1000 may branch into two (2) branches (e.g., a first branch including operations 1030-1040 and a second branch including operations 1060-1070). In some embodiments, the first branch (e.g., operations 1030-1040) may generate a single raw image with realistic blur (e.g., the synthetic long exposure image 1050). Alternatively or additionally, the second branch (e.g., operations 1060-1070) may generate the synthetic short exposure image burst 1080.

In operation 1030, the data generation pipeline 1000 may average linear intensities of the synthetic RAW images generated from the sRGB image burst 1010 to generate a single raw image with relatively realistic blur. In operation 1040, the data generation pipeline 1000 may add heteroscedastic Gaussian noise to add relatively realistic noise (variance) to the intensities of the single blurry raw image. For example, the noise added to the single blurry raw image may be represented by an equation similar to Equation 10.

$$y = \mathcal{N}(x; \sigma_s x + \sigma_r^2) \quad \text{[Eq. 10]}$$

Referring to Equation 10, y may represent the randomized intensity with a variance σ that is a function of an original intensity x. The synthetic long exposure image 1050 may be obtained by converting the RAW image back into a sRGB image using an ISP 1045. However, the present disclosure is not limited in this regard. For example, in some embodiments, the synthetic long exposure image 1050 may be a RAW image, and as such, may not be converted to a sRGB image using the ISP 1045.

In operation 1060, the data generation pipeline 1000 may subsample the 2N−1 consecutive frames of the sRGB image burst 1010 to simulate the read-out gaps in the short exposure image burst 434, resulting in an image burst including N frames. The data generation pipeline 1000 may, in operation 1060, further simulate synthetic RAW images by dividing the N images by an under-exposure gain r that may be typically applied by digital cameras to all captured images. For example, the under-exposure gain r may be equal to ten (10) (e.g., r=10). Alternatively or additionally, the data generation pipeline 1000 may apply color distortion to simulate a typically present purple tint.

In operation 1070, the data generation pipeline 1000 may add heteroscedastic Gaussian noise to add relatively realistic noise (variance) to the intensities of the raw image burst. For example, the noise added to the raw image burst may be represented by an equation similar to Equation 11.

$$\tilde{y} = \mathcal{N}(x; \sigma_s x + \sigma_r^2); y = \tilde{y} \times r \quad \text{[Eq. 11]}$$

The synthetic short exposure image burst 1080 may be obtained by converting the RAW image burst back into a sRGB image burst using an ISP 1075. However, the present disclosure is not limited in this regard. For example, in some embodiments, the synthetic short exposure image burst 1080 may be and/or may include RAW images, and as such, may not be converted to a sRGB image burst using the ISP 1075.

In some embodiments, the data generation pipeline 1000 may select a reference (e.g., ground-truth) image 1090, G, from the sRGB image burst 1010. For example, the data generation pipeline 1000 may select a middle image from the sRGB image burst 1010 having an index of N, SN. However, the present disclosure is not limited in this regard, and the data generation pipeline 1000 may select another image from the sRGB image burst 1010 as the reference image 1090.

Consequently, the data generation pipeline 1000 may generate a triplet of synchronized sRGB images that may include the synthetic long exposure image 1050, the synthetic short exposure image burst 1080, and the reference image 1090. As described with reference to FIG. 11, the triplet of synchronized sRGB images may be used to train the image processing framework 500 of FIG. 5.

Alternatively or additionally, the image processing framework 500 may be trained using real synchronized long exposure images and short exposure image bursts that may have been captured using an image capturing apparatus. For example, in such embodiments, real synchronized images may be captured in RAW format and processed with an ISP (e.g., ISP 1045 or ISP 1075) to obtain real sRGB images. In some embodiments, the cameras and/or image sensors of the image capturing apparatus may be spatially misaligned. Thus, the real sRGB images may be further processed to warp the real long exposure image to a reference (e.g., middle) frame of the real short exposure image burst. For example, the alignment may be performed by using a random sample consensus (RANSAC) algorithm and/or model to calculate a homography fitting of the images.

Figure 11:
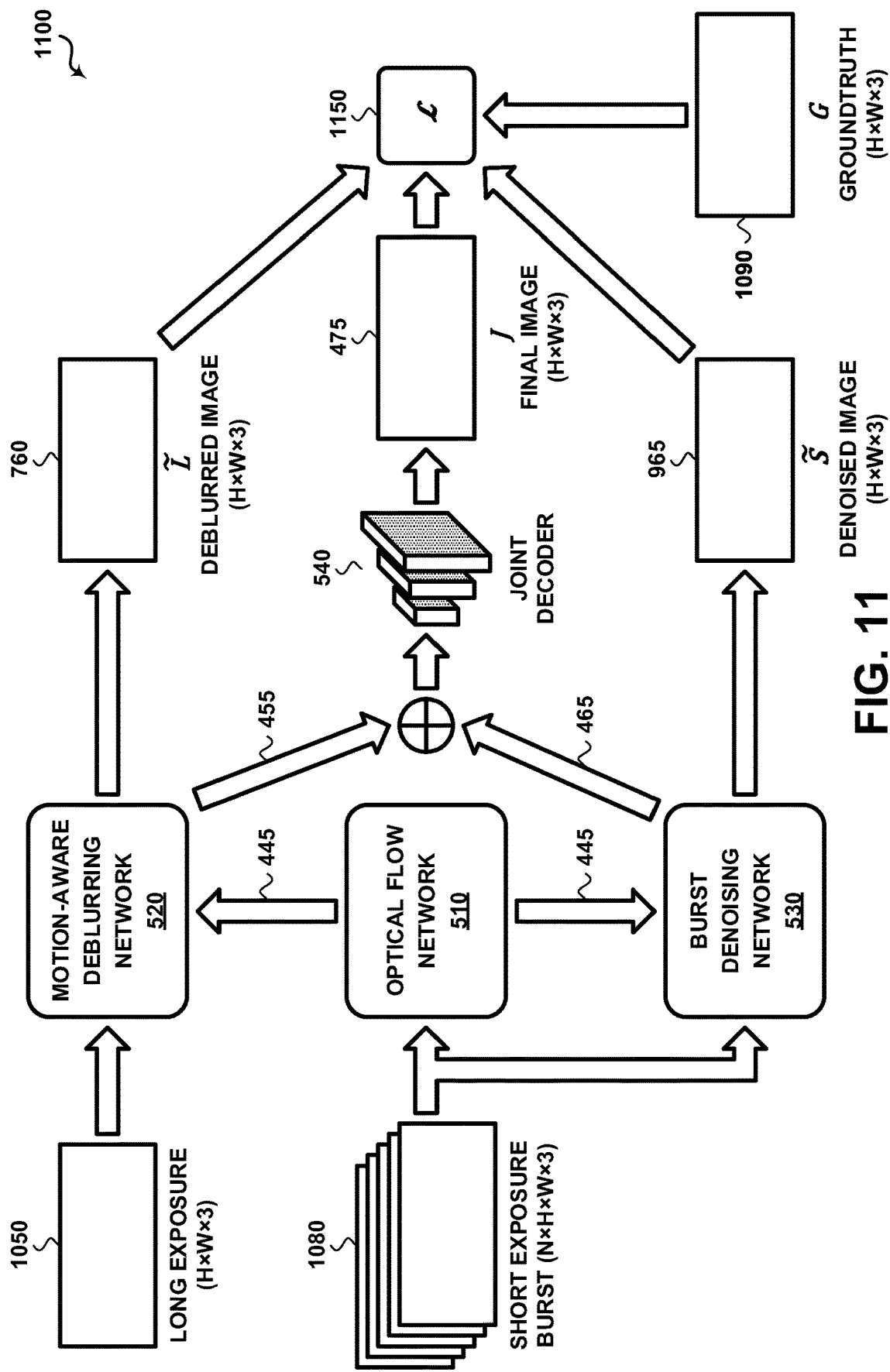
FIG. 11 depicts an example of a process flow for performing joint denoising and deblurring during training time, in accordance with various aspects of the present disclosure.

FIG. 11 depicts an example of a process flow for performing joint denoising and deblurring during training time, in accordance with various aspects of the present disclosure. Referring to FIG. 11, a process flow 1100 for training an image processing framework 500 that implements one or more aspects of the present disclosure is illustrated.

The process flow 1100 may include and/or may be similar in many respects to the image processing framework 500 described above with reference to FIGS. 5 to 8, and may include additional features not mentioned above. Consequently, repeated descriptions of the image processing framework 500 described above with reference to FIGS. 5 to 8 may be omitted for the sake of brevity.

As shown in FIG. 11, a synchronized triplet of synthetic and/or real training images may be provided to the image processing framework 500 during training time of the image processing framework 500. For example, the synthetic long exposure image 1050 may be provided to the motion-aware deblurring network 520, the synthetic short exposure image burst 1080 may be provided to the optical flow network 510 and to the burst denoising network 530, and the reference image 1090 may be provided to the loss component 1150.

As described above with reference to FIGS. 5 to 8, the optical flow network 510 may generate motion information 445 based on the synthetic short exposure image burst 1080 and provide the generated motion information 445 to the motion-aware deblurring network 520 and the burst denoising network 530. The motion-aware deblurring network 520 may generate a deblurred image 760 from the synthetic long exposure image 1050 based on the motion information 445. The burst denoising network 530 may generate a denoised image 965 from the synthetic short exposure image burst 1080 based on the motion information 445. The joint decoder 540 may generate a final image 475 based on the deblurring features 455 and the denoising features 465.

In some embodiments, the loss component 1150 may be configured to calculate and/or minimize a loss $\mathcal{L}$. The loss $\mathcal{L}$ may include terms related to the deblurred image 760, the denoised image 965, and the final image 475. For example, the loss $\mathcal{L}$ may be represented by an equation similar to Equation 12.

$$\mathcal{L} = \mathcal{L}_1(J, G) + \mathcal{L}_1(\tilde{S}, G) + \mathcal{L}_1(\tilde{L}, G) \qquad \text{[Eq. 12]}$$

Referring to Equation 12, $\mathcal{L}_1$ may represent an average L1 norm distance, J may represent the final image 475, $\tilde{L}$ may represent the deblurred image 760, $\tilde{S}$ may represent the denoised image 965, and G may represent the reference image 1090. As used herein, $\mathcal{L}_1(\tilde{S}, G)$ and $\mathcal{L}_1(\tilde{L}, G)$ may be considered as auxiliary terms that may penalize intermediate deblurring and denoising outputs from the motion-aware deblurring network 520 and the burst denoising network 530, respectively.

Advantageously, the apparatuses and processes for image processing and jointly denoising and deblurring images, described above with reference to FIGS. 1 to 12, may provide for synchronizing the capture of a burst of short exposure images from one camera and the capture of a long exposure image from another camera. Consequently, the two sets of images may be jointly processed (e.g., fused together) to take advantage of the complementary information included by the images from both sources in order to obtain a clean and sharp image. Aspects described herein may further provide for guiding a motion-aware deblurring network with external motion information from the synchronized short exposure burst, and as such, obtaining an improved deblurring result when compared to a deblurring result without such external motion information. Furthermore, as mobile devices with multiple rear-facing cameras become more commonplace, the aspects described herein may be provided using these already-existing cameras.

Figure 12:
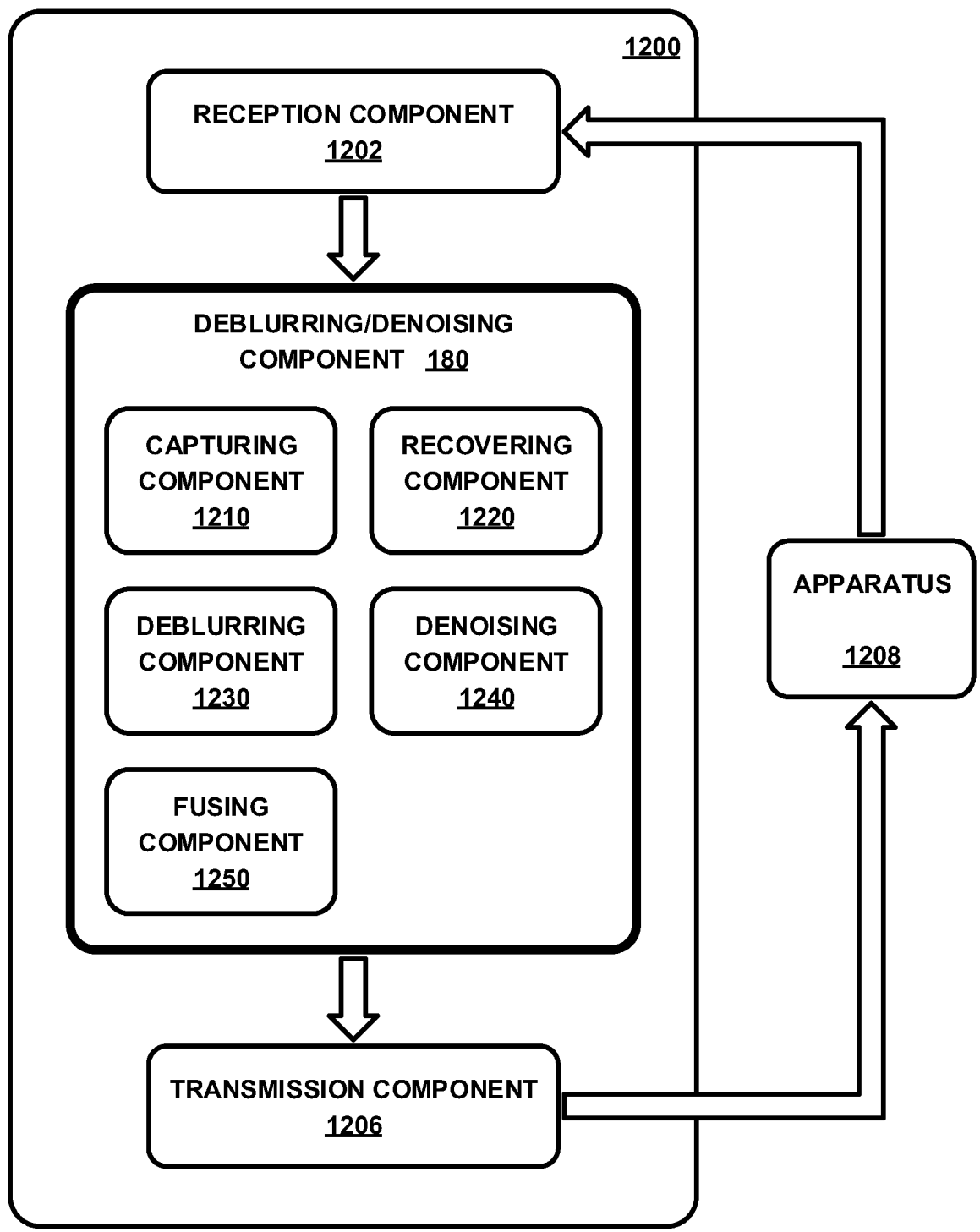
FIG. 12 illustrates a block diagram of an example apparatus for performing joint denoising and deblurring, in accordance with various aspects of the present disclosure.

FIG. 12 illustrates a block diagram of an example apparatus for performing joint denoising and deblurring, in accordance with various aspects of the present disclosure. The apparatus 1200 may be a computing device (e.g., device 100 of FIG. 1) and/or a computing device may include the apparatus 1200. In some embodiments, the apparatus 1200 may include a reception component 1202 configured to receive communications (e.g., wired, wireless) from another apparatus (e.g., apparatus 1208), a deblurring/denoising component 180 configured to jointly perform denoising and deblurring, and a transmission component 1206 configured to transmit communications (e.g., wired, wireless) to another apparatus (e.g., apparatus 1208). The components of the apparatus 1200 may be in communication with one another (e.g., via one or more buses or electrical connections). As shown in FIG. 12, the apparatus 1200 may be in communication with another apparatus 1208 (such as, but not limited to, a server, a laptop, a smartphone, a UE, a wearable device, a smart device, an IoT device, and the like) using the reception component 1202 and/or the transmission component 1206.

In some embodiments, the apparatus 1200 may be configured to perform one or more operations described herein in connection with FIGS. 1 to 11. Alternatively or additionally, the apparatus 1200 may be configured to perform one or more processes described herein, such as method 1300 of FIG. 13. In some embodiments, the apparatus 1200 may include one or more components of the device 100 described with reference to FIG. 1.

The reception component 1202 may receive communications, such as control information, data communications, or a combination thereof, from the apparatus 1208 (e.g., a server, a laptop, a smartphone, a UE, a wearable device, a smart device, an IoT device, and the like). The reception component 1202 may provide received communications to one or more other components of the apparatus 1200, such as the deblurring/denoising component 180. In some embodiments, the reception component 1202 may perform signal processing on the received communications, and may provide the processed signals to the one or more other components. In some embodiments, the reception component 1202 may include one or more antennas, a receive processor, a controller/processor, a memory, or a combination thereof, of the device 100 described with reference to FIG. 1.

The transmission component 1206 may transmit communications, such as control information, data communications, or a combination thereof, to the apparatus 1208 (e.g., a server, a laptop, a smartphone, a UE, a wearable device, a smart device, an IoT device, and the like). In some embodiments, the deblurring/denoising component 180 may generate communications and may transmit the generated communications to the transmission component 1206 for transmission to the apparatus 1208. In some embodiments, the transmission component 1206 may perform signal processing on the generated communications, and may transmit the processed signals to the apparatus 1208. In other embodiments, the transmission component 1206 may include one or more antennas, a transmit processor, a controller/processor, a memory, or a combination thereof, of the device 100 described with reference to FIG. 1. In some embodiments, the transmission component 1206 may be co-located with the reception component 1202 such as in a transceiver and/or a transceiver component.

The deblurring/denoising component 180 may be configured to perform image processing. In some embodiments, the deblurring/denoising component 180 may include a set of components, such as a capturing component 1210 configured to simultaneously capture a long exposure image and a burst of short exposure images, a recovering component 1220 configured to recover motion information from the burst of short exposure images, a deblurring component 1230 configured to perform motion-aware deblurring on the long exposure image, a denoising component 1240 configured to denoise the burst of short exposure images, and a fusing component 1250 configured to fuse deblurring features and denoising features to obtain a final image.

In some embodiments, the set of components may be separate and distinct from the deblurring/denoising component 180. In other embodiments, one or more components of the set of components may include or may be implemented within a controller/processor (e.g., the processor 120), a memory (e.g., the memory 130), or a combination thereof, of the device 100 described above with reference to FIG. 1. Alternatively or additionally, one or more components of the set of components may be implemented at least in part as software stored in a memory, such as the memory 130. For example, a component (or a portion of a component) may be implemented as computer-executable instructions or code stored in a computer-readable medium (e.g., a non-transitory computer-readable medium) and executable by a controller or a processor to perform the functions or operations of the component.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIGS. 1 to 11.

Figure 13:
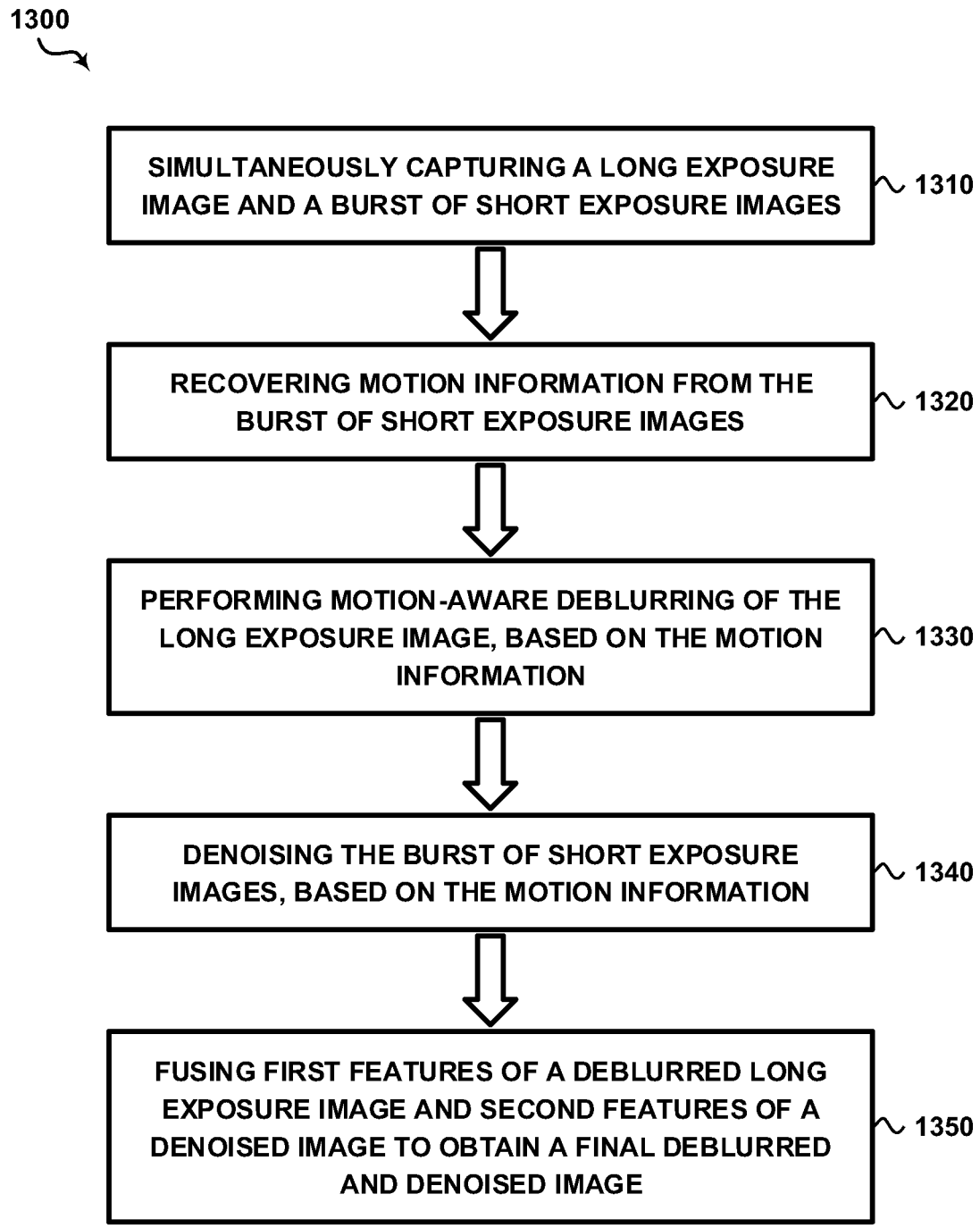
FIG. 13 depicts a flowchart of an example method for performing joint denoising and deblurring, in accordance with various aspects of the present disclosure.

Referring to FIG. 13, in operation, an apparatus 1200 may perform a method 1300 of performing joint denoising and deblurring. The method 1300 may be performed by at least one of the device 100 (which may include the processor 120, the memory 130, and the storage component 140, and which may be the entire device 100 and/or include one or more components of the device 100, such as the input component 150, the output component 160, the communication interface 170, and/or the deblurring/denoising component 180), and/or the apparatus 1200. The method 1300 may be performed by the device 100, the apparatus 1200, and/or the deblurring/denoising component 180 in communication with the apparatus 1208 (e.g., a server, a laptop, a smartphone, a UE, a wearable device, a smart device, an IoT device, and the like).

At block 1310 of FIG. 13, the method 1300 may include simultaneously capturing a long exposure image and a burst of short exposure images. For example, in an aspect, the device 100, the deblurring/denoising component 180, and/or the capturing component 1210 may be configured to or may include means for simultaneously capturing a long exposure image 436 and a burst of short exposure images 434.

For example, the capturing at block 1310 may include capturing the long exposure image 436 and the burst of short exposure images 434 during a substantially similar and/or the same time span, as described above with reference to FIG. 3. For example, the long exposure image 436 may be captured during a $\Delta t_l$ time period (interval) starting from $t_0$, and the burst of short exposure images 434 may be obtained by sequentially capturing a plurality of N images during a substantially similar and/or the same $\Delta t_l$ time period starting from $t_0$.

In some embodiments, the capturing at block 1310 may include analyzing a scene, and determining, based on the analyzing, whether the scene meets low-light criteria, as described above with reference to FIG. 4. In some optional or additional embodiments, the capturing at block 1310 may include, based on determining that the scene meets the low-light criteria, controlling a first camera to capture the long exposure image 436 during a first time period, and controlling a second camera to capture the burst of short exposure images 434 during a second time period. The first time period and the second time period may overlap each other.

Further, for example, the capturing at block 1310 may be performed to obtain temporally synchronized images to take advantage of the complementary information included by the long exposure image (e.g., clean but perhaps blurry) and the burst of short exposure images (e.g., sharp but perhaps noisy) in order to obtain a clean and sharp image.

At block 1320 of FIG. 13, the method 1300 may include recovering motion information from the burst of short exposure images. For example, in an aspect, the device 100, the deblurring/denoising component 180, and/or the recovering component 1220 may be configured to or may include means for recovering motion information 445 from the burst of short exposure images 434.

For example, the recovering at block 1320 may include providing the burst of short exposure images 434 to an optical flow network 510 that may be configured to recover motion information 445 from the burst of short exposure images 434, as described above with reference to FIG. 6.

In some embodiments, the recovering at block 1320 may include generating, using the optical flow network 510, and a plurality of optical flows, based on the burst of short exposure images 434.

In optional or additional embodiments, the recovering at block 1320 may include obtaining discrete samples of motion trajectories of a plurality of points in each image of the burst of short exposure images 434 relative to a reference position $p_m$ at a reference time step $t_m$, and interpolating, for each corresponding point of the plurality of points, the discrete samples of the corresponding point along a motion trajectory 810 of the corresponding point.

In other optional or additional embodiments, the recovering at block 1320 may include generating the motion information 445 including the plurality of optical flows.

Further, for example, the recovering at block 1320 may be performed to generate a relatively more accurate motion trajectory from the burst of short exposure images 434 than may be generated by a related deblurring and/or denoising network, in order to produce a relatively more accurate deblurred image and/or denoised image when compared to the related deblurring and/or denoising networks, respectively.

At block 1330 of FIG. 13, the method 1300 may include performing motion-aware deblurring of the long exposure image, based on the motion information. For example, in an aspect, the device 100, the deblurring/denoising component 180, and/or the deblurring component 1230 may be configured to or may include means for performing motion-aware deblurring of the long exposure image 436, based on the motion information 445.

For example, the deblurring at block 1330 may include providing the long exposure image 436 to a motion-aware deblurring network 520 that may be configured to deblur the long exposure image 436 based on the motion information 445, as described above with reference to FIGS. 7A to 7D, 8A, and 8B.

In some embodiments, the deblurring at block 1330 may include providing, to the motion-aware deblurring network 520, the long exposure image 436 and the motion information 445 including the plurality of optical flows.

In optional or additional embodiments, the deblurring at block 1330 may include obtaining, from the motion-aware deblurring network 520, the first deblurring features 455 of the deblurred long exposure image 760, based on the plurality of optical flows.

At block 1340 of FIG. 13, the method 1300 may include denoising the burst of short exposure images, based on the motion information. For example, in an aspect, the device 100, the deblurring/denoising component 180, and/or the denoising component 1240 may be configured to or may include means for denoising the burst of short exposure images 434, based on the motion information 445.

For example, the denoising at block 1340 may include providing the burst of short exposure images 434 to a burst denoising network 530 that may be configured to denoise the burst of short exposure images 434 based on the motion information 445, as described above with reference to FIG. 9.

In some embodiments, the denoising at block 1340 may include providing, to the burst denoising network 530, the burst of short exposure images 434 and the motion information 445 including the plurality of optical flows.

In optional or additional embodiments, the denoising at block 1340 may include obtaining, from the burst denoising network 530, the second denoising features 465 of the denoised image 965, based on the plurality of optical flows.

In other optional or additional embodiments, the denoising at block 1340 may include obtaining respective feature representations of the burst of short exposure images 434 by encoding each image of burst of short exposure images 434.

In other optional or additional embodiments, the denoising at block 1340 may include warping the feature representations to obtain aligned feature representations.

In other optional or additional embodiments, the denoising at block 1340 may include fusing the aligned feature representations to generate the second denoising features 465 of the denoised image 965.

At block 1350 of FIG. 13, the method 1300 may include fusing first features of a deblurred long exposure image and second features of a denoised image to obtain a final deblurred and denoised image. For example, in an aspect, the device 100, the deblurring/denoising component 180, and/or the fusing component 1250 may be configured to or may include means for fusing first features 455 of a deblurred long exposure image 760 and second features 465 of a denoised image 965 to obtain a final deblurred and denoised image 475.

For example, the fusing at block 1350 may include providing the first features 455 of the deblurred long exposure image 760 and the second features 465 of the denoised image 965 to a joint decoder network 540 that may be configured to fuse the first features 455 and the second features 465 to generate the final image 475, as described above with reference to FIG. 5.

In some embodiments, the fusing at block 1350 may include concatenating the first features 455 of the deblurred long exposure image 760 and the second features 465 of the denoised image 965 into a feature map.

In optional or additional embodiments, the fusing at block 1350 may include decoding a result of the joint decoder network 540 into the final deblurred and denoised image 475.

Further, for example, the fusing at block 1350 may be performed to take advantage of the complementary information included by the long exposure image (e.g., clean but perhaps blurry) and the burst of short exposure images (e.g., sharp but perhaps noisy) in order to obtain a clean and sharp image.

In an optional or additional aspect that may be combined with any other aspects, the method 1300 may further include creating a dataset of synthetic dual camera images, and training the image processing framework using the dataset of synthetic dual camera images, as discussed above with reference to FIG. 11. Alternatively or additionally, the creating of the dataset of the synthetic dual camera images may include obtaining a plurality of consecutive clean images from a sequence of images, inverting tone-mapping, gamma compression, and color correction on the plurality of consecutive clean images, generating a synthetic long exposure image by averaging and inserting noise to the inverted plurality of consecutive clean images, and generating a synthetic burst of short exposure images by subsampling the inverted plurality of consecutive clean images, and adding noise and color distortion to the subsampled plurality of consecutive clean images, as discussed above with reference to FIG. 10.

The following aspects are illustrative only and aspects thereof may be combined with aspects of other embodiments or teaching described herein, without limitation.

Aspect 1 is a method of image processing, to be performed by a processor of an image processing framework, including simultaneously capturing a long exposure image and a burst of short exposure images, recovering motion information from the burst of short exposure images, performing motion-aware deblurring of the long exposure image, based on the motion information, denoising the burst of short exposure images, based on the motion information, and fusing first features of a deblurred long exposure image and second features of a denoised image to obtain a final deblurred and denoised image.

In Aspect 2, the simultaneous capturing of the long exposure image and the burst of short exposure images of Aspect 1 may include analyzing a scene, determining, based on the analyzing, whether the scene meets low-light criteria, and based on determining that the scene meets the low-light criteria, controlling a first camera to capture the long exposure image during a first time period, and controlling a second camera to capture the burst of short exposure images during a second time period. The first time period and the second time period may overlap each other.

In Aspect 3, the recovering of the motion information of Aspects 1 or 2 may include generating, using an optical flow network, a plurality of optical flows, based on the burst of short exposure images, and generating the motion information including the plurality of optical flows.

In Aspect 4, the generating of the plurality of optical flows of any of Aspects 1 to 3 may include obtaining discrete samples of motion trajectories of a plurality of points in each image of the burst of short exposure images relative to a reference position at a reference time step, and interpolating, for each corresponding point of the plurality of points, the discrete samples of the corresponding point along a motion trajectory of the corresponding point.

In Aspect 5, the performing of the motion-aware deblurring of the long exposure image of any of Aspects 1 to 4 may include providing, to a motion-aware deblurring network, the long exposure image and the motion information including the plurality of optical flows, and obtaining, from the motion-aware deblurring network, the first features of the deblurred long exposure image, based on the plurality of optical flows.

In Aspect 6, the denoising of the burst of short exposure images of any of Aspects 1 to 5 may include providing, to a burst denoising network, the burst of short exposure images and the motion information including the plurality of optical flows, and obtaining, from the burst denoising network, the second features of the denoised image, based on the plurality of optical flows.

In Aspect 7, the denoising of the burst of short exposure images of any of Aspects 1 to 6 may include obtaining respective feature representations of the burst of short exposure images by encoding each image of burst of short exposure images, warping the feature representations to obtain aligned feature representations, and fusing the aligned feature representations to generate the second features of the denoised image.

In Aspect 8, the fusing of the first features of the deblurred long exposure image and the second features of the denoised image of any of Aspects 1 to 7 may include concatenating the first features of the deblurred long exposure image and the second features of the denoised image into a feature map, providing the feature map to a joint denoising-deblurring network, and decoding a result of the joint denoising-deblurring network into the final deblurred and denoised image.

In Aspect 9, any of Aspects 1 to 8 may further include creating a dataset of synthetic dual camera images, and training the image processing framework using the dataset of synthetic dual camera images.

In Aspect 10, the creating of the dataset of the synthetic dual camera images of any of Aspects 1 to 9 may include obtaining a plurality of consecutive clean images from a sequence of images, inverting tone-mapping, gamma compression, and color correction on the plurality of consecutive clean images, generating a synthetic long exposure image by averaging and inserting noise to the inverted plurality of consecutive clean images, and generating a synthetic burst of short exposure images by subsampling the inverted plurality of consecutive clean images, and adding noise and color distortion to the subsampled plurality of consecutive clean images.

Aspect 11 is an apparatus for image processing to be performed by an image processing framework. The apparatus includes at least one camera, a memory storing instructions, and a processor communicatively coupled to the at least one camera and to the memory. The processor is configured to perform one or more of the methods of any of Aspects 1 to 10.

Aspect 12 is an apparatus for image processing including means for performing one or more of the methods of any of Aspects 1 to 10.

Aspect 13 is a non-transitory computer-readable storage medium storing computer-executable instructions for evaluating a reliability of 3D shape predictions. The computer-executable instructions are configured, when executed by at least one processor of a device, to cause the device to perform one or more of the methods of any of Aspects 1 to 10.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations. Non-transitory computer-readable media may exclude transitory signals.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EEPROM or Flash memory), a static random access memory (SRAM), a portable compact disc read-only memory (CD-ROM), a DVD, a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLAs) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings (e.g., FIGS. 1, 3, and 5 to 10) may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, and the like, that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a CPU that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which includes one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It may also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and the like), and may be used interchangeably with "one or more." Where only one item is intended, the term "one" or similar language is used. Also, as used herein, the terms "has," "have," "having," "includes," "including," or the like are intended to be open-ended terms. Further, the phrase "based on" is intended to mean "based, at least in part, on" unless explicitly stated otherwise. In addition, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment. As used herein, such terms as "1st" and "2nd," or "first" and "second" may be used to simply distinguish a corresponding component from another, and does not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

It is to be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations may be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

Furthermore, the described features, advantages, and characteristics of the present disclosure may be combined in any suitable manner in one or more embodiments. One skilled in the relevant art may recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

What is claimed is:

1. A method of image processing, to be performed by a processor of an image processing framework, comprising:
    simultaneously capturing a long exposure image and a burst of short exposure images;
    recovering motion information from the burst of short exposure images;
    performing motion-aware deblurring of the long exposure image, based on the motion information;
    denoising the burst of short exposure images, based on the motion information; and
    fusing first features of a deblurred long exposure image and second features of a denoised image to obtain a final deblurred and denoised image,
    wherein the simultaneous capturing of the long exposure image and the burst of short exposure images comprises controlling a first camera to capture the long exposure image during a first time period, and controlling a second camera to capture the burst of short exposure images during a second time period, wherein the first time period and the second time period overlap each other.

2. The method of claim 1, wherein the simultaneous capturing of the long exposure image and the burst of short exposure images further comprises:
    analyzing a scene;
    determining, based on the analyzing, whether the scene meets low-light criteria; and
    based on determining that the scene meets the low-light criteria, performing the controlling of the first camera to capture the long exposure image during a first time period, and the controlling of the second camera to capture the burst of short exposure images during a second time period.

3. The method of claim 1, wherein the recovering of the motion information comprises:
generating, using an optical flow network, a plurality of optical flows, based on the burst of short exposure images; and
generating the motion information comprising the plurality of optical flows.

4. The method of claim 3, wherein the generating of the plurality of optical flows comprises:
obtaining discrete samples of motion trajectories of a plurality of points in each image of the burst of short exposure images relative to a reference position at a reference time step; and
interpolating, for each corresponding point of the plurality of points, the discrete samples of the corresponding point along a motion trajectory of the corresponding point.

5. The method of claim 3, wherein the performing of the motion-aware deblurring of the long exposure image comprises:
providing, to a motion-aware deblurring network, the long exposure image and the motion information comprising the plurality of optical flows; and
obtaining, from the motion-aware deblurring network, the first features of the deblurred long exposure image, based on the plurality of optical flows.

6. The method of claim 3, wherein the denoising of the burst of short exposure images comprises:
providing, to a burst denoising network, the burst of short exposure images and the motion information comprising the plurality of optical flows; and
obtaining, from the burst denoising network, the second features of the denoised image, based on the plurality of optical flows.

7. The method of claim 1, wherein the denoising of the burst of short exposure images comprises:
obtaining respective feature representations of the burst of short exposure images by encoding each image of burst of short exposure images;
warping the feature representations to obtain aligned feature representations; and
fusing the aligned feature representations to generate the second features of the denoised image.

8. The method of claim 1, wherein the fusing of the first features of the deblurred long exposure image and the second features of the denoised image comprises:
concatenating the first features of the deblurred long exposure image and the second features of the denoised image into a feature map;
providing the feature map to a joint denoising-deblurring network; and
decoding a result of the joint denoising-deblurring network into the final deblurred and denoised image.

9. The method of claim 1, further comprising:
creating a dataset of synthetic dual camera images; and
training the image processing framework using the dataset of synthetic dual camera images.

10. The method of claim 1, wherein the creating of the dataset of the synthetic dual camera images comprises:
obtaining a plurality of consecutive clean images from a sequence of images;
inverting tone-mapping, gamma compression, and color correction on the plurality of consecutive clean images;
generating a synthetic long exposure image by averaging and inserting noise to the inverted plurality of consecutive clean images; and
generating a synthetic burst of short exposure images by subsampling the inverted plurality of consecutive clean images, and adding noise and color distortion to the subsampled plurality of consecutive clean images.

11. An apparatus for image processing to be performed by an image processing framework, comprising:
at least one camera;
a memory storing instructions; and
a processor communicatively coupled to the at least one camera and to the memory, wherein the processor is configured to execute the instructions to:
simultaneously capture, using the at least one camera, a long exposure image and a burst of short exposure images;
recover motion information from the burst of short exposure images;
perform motion-aware deblurring of the long exposure image, based on the motion information;
denoise the burst of short exposure images, based on the motion information; and
fuse first features of a deblurred long exposure image and second features of a denoised image to obtain a final deblurred and denoised image, and
wherein the processor is further configured to execute the instructions to:
control a first camera of the at least one camera to capture the long exposure image during a first time period, and
control a second camera of the at least one camera to capture the burst of short exposure images during a second time period, the first time period and the second time period overlapping each other.

12. The apparatus of claim 11, wherein the processor is further configured to execute further instructions to:
analyze a scene;
determine, based on the analysis of the scene, whether the scene meets low-light criteria; and
based on a determination that the scene meets the low-light criteria, perform to control the first camera of the at least one camera to capture the long exposure image during the first time period, and control the second camera of the at least one camera to capture the burst of short exposure images during the second time period.

13. The apparatus of claim 11, wherein the processor is further configured to execute further instructions to:
generate, using an optical flow network, a plurality of optical flows, based on the burst of short exposure images; and
generate the motion information comprising the plurality of optical flows.

14. The apparatus of claim 13, wherein the processor is further configured to execute further instructions to:
obtain discrete samples of motion trajectories of a plurality of points in each image of the burst of short exposure images relative to a reference position at a reference time step; and
interpolate for each corresponding point of the plurality of points, the discrete samples of the corresponding point along a motion trajectory of the corresponding point.

15. The apparatus of claim 13, wherein the processor is further configured to execute further instructions to:

provide, to a motion-aware deblurring network, the long exposure image and the motion information comprising the plurality of optical flows;

obtain, from the motion-aware deblurring network, the first features of the deblurred long exposure image, based on the plurality of optical flows;

provide, to a burst denoising network, the burst of short exposure images and the motion information comprising the plurality of optical flows; and obtain, from the burst denoising network, the second features of the denoised image, based on the plurality of optical flows.

16. The apparatus of claim 11, wherein the processor is further configured to execute further instructions to:

obtain respective feature representations of the burst of short exposure images by encoding each image of burst of short exposure images;

warp the feature representations to obtain aligned feature representations; and fuse the aligned feature representations to generate the second features of the denoised image.

17. The apparatus of claim 11, wherein the processor is further configured to execute further instructions to:

concatenate the first features of the deblurred long exposure image and the second features of the denoised image into a feature map;

provide the feature map to a joint denoising-deblurring network; and decode a result of the joint denoising-deblurring network into the final deblurred and denoised image.

18. The apparatus of claim 11, wherein the processor is further configured to execute further instructions to:

create a dataset of synthetic dual camera images;

obtain a plurality of consecutive clean images from a sequence of images;

invert tone-mapping, gamma compression, and color correction on the plurality of consecutive clean images;

generate a synthetic long exposure image by averaging and inserting noise to the inverted plurality of consecutive clean images;

generate a synthetic burst of short exposure images by subsampling the inverted plurality of consecutive clean images, and adding noise and color distortion to the subsampled plurality of consecutive clean images; and train the image processing framework using the dataset of synthetic dual camera images.

19. A non-transitory computer-readable storage medium storing computer-executable instructions for image processing that, when executed by at least one processor of a device, cause the device to:

simultaneously capture a long exposure image and a burst of short exposure images;

recover motion information from the burst of short exposure images;

perform motion-aware deblurring of the long exposure image, based on the motion information;

denoise the burst of short exposure images, based on the motion information; and fuse first features of a deblurred long exposure image and second features of a denoised image to obtain a final deblurred and denoised image, wherein the computer-executable instructions, when executed by the at least one processor, further cause the device to:

control a first camera to capture the long exposure image during a first time period, and control a second camera to capture the burst of short exposure images during a second time period, the first time period and the second time period overlapping each other.

20. The non-transitory computer-readable storage medium of claim 19, wherein the computer-executable instructions, when executed by the at least one processor, further cause the device to:

analyze a scene;

determine, based on the analysis of the scene, whether the scene meets low-light criteria; and based on a determination that the scene meets the low-light criteria, perform to control the first camera to capture the long exposure image during the first time period, and control the second camera to capture the burst of short exposure images during the second time period.

* * * * *